United States Patent [19]
Solomon

[11] Patent Number: 5,974,043
[45] Date of Patent: Oct. 26, 1999

[54] SYSTEM AND METHOD FOR COMMUNICATING INFORMATION USING THE PUBLIC SWITCHED TELEPHONE NETWORK AND A WIDE AREA NETWORK

[75] Inventor: Yoram Solomon, Kfar Saba, Israel

[73] Assignee: Solram Electronics Ltd., Kfar Saba, Israel

[21] Appl. No.: 08/714,710

[22] Filed: Sep. 16, 1996

[51] Int. Cl.$^6$ .................................................. H04L 12/66
[52] U.S. Cl. .......................... 370/352; 379/215; 379/211; 379/209
[58] Field of Search .............................. 379/93.01, 93.05, 379/93.07–93.08, 93.14, 93.21, 93.28, 93.31–93.32, 93.34, 93.17, 215, 221, 211, 209, 93.09; 370/352–356, 238, 389, 360, 465, 422; 340/827; 395/285, 831

[56] References Cited

U.S. PATENT DOCUMENTS

| | | | |
|---|---|---|---|
| 5,604,737 | 2/1997 | Iwami et al. | 370/352 |
| 5,608,786 | 3/1997 | Gordon | 379/100 |
| 5,809,128 | 9/1998 | McMullin | 379/215 |

*Primary Examiner*—Ajit Patel
*Attorney, Agent, or Firm*—McDermott, Will & Emery

[57] ABSTRACT

A system and a method for communicating information using the public switched telephone network and a wide area network. The method includes the steps of a) the first system dialling a first telephone call to the second system, b) the first system sending to the second system a data block which includes at least data defining a call request, c) disconnecting the first telephone call, d) both systems connecting to the wide area network by each dialling a second telephone call, wherein the second system uses the call request data for dialling the second telephone call, e) one of the systems connecting to the other system through the wide area network and f) exchanging the information between the systems through the wide area network. The system includes at least a computer and a communications interface. The system can also include a telephone which includes a communication unit, a computer interface, a controller and a switch. The switch is switchable between two states. In the first state the communication unit is connected to a telephone line. In the second state the communication unit is connected to the computer and the computer is connected to the telephone line.

49 Claims, 18 Drawing Sheets

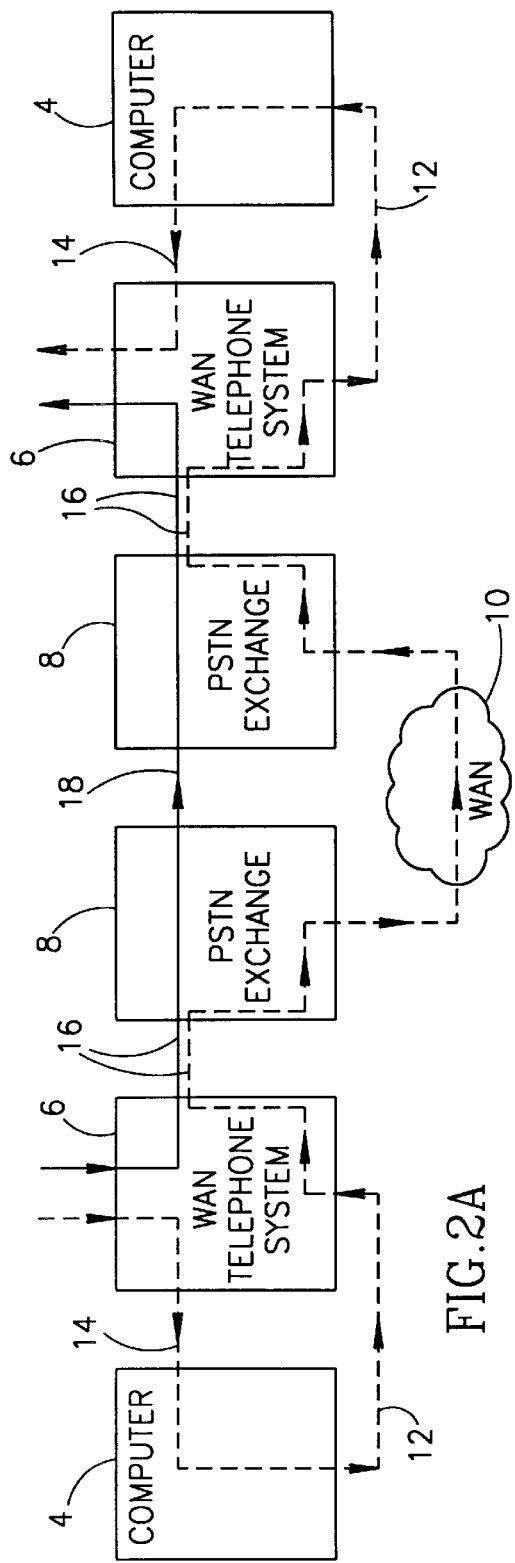
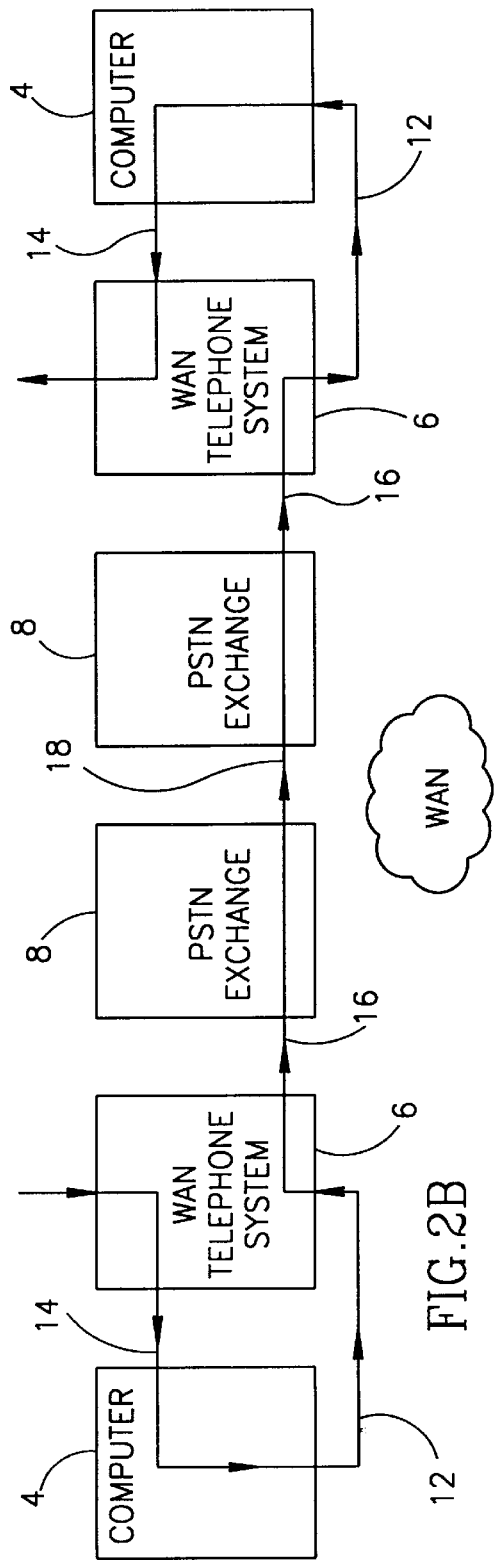
FIG.2A
FIG.2B

SYSTEM AND METHOD FOR COMMUNICATING INFORMATION USING THE PUBLIC SWITCHED TELEPHONE NETWORK AND A WIDE AREA NETWORK

FIELD OF THE INVENTION

The present invention relates to the field of telephony in general and to the field of voice and video communication using wide area networks (WAN) in particular.

BACKGROUND OF THE INVENTION

Presently, various commercial and non commercial communication services allow exchanging of digital information packets between physically remote computers connected by an international network of servers using the public switched telephone network (PSTN) or any other communication network. Many commercial service providers also provide access to the Internet. An example of one type of use of such services which gained popularity lately is the Internet telephone. The Internet telephone is based on a combination of software and hardware which allows a user of a computer with access to the Internet to establish a vocal conversation link with another user's computer through the modems installed in both computers. After the establishment of an Internet link, the user speaks to a microphone which is connected to a sound card installed in the computer, the voice information is digitized, compressed and sent as digital information packets using the Internet's packet switching protocols to reach the other user's computer, where it is decompressed and converted to analog sound which the other user can listen to. Thus, for the price of a local telephone call, a user with access to the Internet can make unlimited long distance and international calls to other users which have Internet access. The recent availability of full duplex sound cards and the prospects of continuing improvements in speed, data carrying capacity and reliability of the services of many Internet service providers, makes Internet telephony attractive to many users.

A drawback of existing Internet telephony methods is the fact that in order to use them a user must establish an Internet connection and use the microphone and sound card installed in the computer, thus, the user must be near the computer.

An additional drawback of current Internet telephony methods is the fact that both users who are wishing to conduct a conversation must coordinate in advance a time slot during which both users will be seated by their computers after having established an Internet connection. Thus a user cannot establish a net telephone conversation with another user unless the other user is already connected to the Internet.

Similar disadvantages exist for users who want to exchange information using computers connected to a WAN.

SUMMARY OF THE PRESENT INVENTION

There is therefore provided, in accordance with a preferred embodiment of the present invention, a telephone for communicating information using the PSTN or a WAN, the telephone being connectable to a computer and to a primary telephone line. The computer includes a communications interface connectable to the PSTN. The telephone includes a computer interface, a communication unit, a controller and a switch. The computer interface communicates with the computer. The communication unit receives telephony signals from a user and provides telephony signals to the user. The controller is suitably connected to the communication unit and processes the signals received from the communication unit or the output of the computer. The controller also controls the communication unit and the computer. The switch is suitably connected to the controller, the computer interface and the primary telephone line. The switch controls the flow of information between the controller, the computer and the primary telephone line. The switch is switchable between two states, a first state in which the communication unit is connected to the PSTN through the controller and the switch, and a second state in which the communication unit is connected through the controller, the switch and the computer interface to the computer, and the communications interface of the computer is connected to the PSTN by the primary telephone line.

There is also provided, in accordance with a preferred embodiment of the present invention, a telephone system for communicating information using the public switched telephone network (PSTN) or a wide area network (WAN). The telephone system includes a computer and a telephone. The computer includes a communications interface connectable to the PSTN. The telephone is connected to the computer and to a primary telephone line. The telephone communicates information using the PSTN or a WAN. The telephone includes a computer interface, a communication unit, a controller and a switch. The computer interface of the telephone communicates with the computer. The communication unit receives telephony signals from a user and provides telephony signals to the user. The controller is connected to the communication unit and processes the signals received from the communication unit or the output of the computer, The controller also controls the communication unit and the computer. The switch is connected to the controller, the computer interface and the primary telephone line, thereby controlling the flow of information between the controller, the computer and the primary telephone line. The switch is switchable between two states, a first state in which the communication unit is connected to the PSTN through the controller and the switch, and a second state in which the communication unit is connected through the controller, the switch and the computer interface to the computer, and the communications interface of the computer is connected to the PSTN by the primary telephone line.

In accordance with a preferred embodiment of the present invention, the communication unit of the telephone includes at least one local telephony device suitably connected to a local telephone line and an interface suitably connected to the local telephone line and to the controller. The interface interfaces the at least one local telephony device with the controller. The local telephone line includes the local telephone wires and the telephony sockets which are connected to the local telephone wires.

In accordance with another preferred embodiment of the present invention, the communication unit of the telephone includes a remote telephony device and an interface. The remote telephony device is suitably connected through the PSTN to a secondary telephone line. The interface is suitably connected to the secondary telephone line and to the controller and interfaces the remote telephony device with the controller.

Further, in accordance with another preferred embodiment of the present invention, the communication unit of the telephone includes a first transceiver suitably connected to the controller, and a cordless WAN telephone. The cordless WAN telephone includes a user interface which receives telephony signals from the user and sends telephony signals to the user. The cordless WAN telephone also includes a second transceiver suitably connected to the user interface for wirelessly communicating with the first transceiver.

Additionally, in accordance with still another preferred embodiment of the present invention, the communication unit of the telephone includes a corded WAN telephone connected to the controller. The corded WAN telephone includes a user interface which receives telephony signals from the user and sends telephony signals to the user.

In accordance with another preferred embodiment of the present invention, the communications interface of the computer which is connected to the telephone is a modem.

According to yet another preferred embodiment of the present invention, the information communicated by the telephone is voice information or control information or text information or data files or graphic information or video information.

Still further, in accordance with a preferred embodiment of the present invention, the information communicated by the telephone is analog information or digital information or a combination of analog information and digital information.

In accordance with an additional preferred embodiment of the present invention, the computer which is connected to the telephone also includes a sound card. The sound card digitizes the analog voice signals of the user which are received from the communication unit, and converts digital voice data received from the WAN by the computer into analog voice signals. The analog voice signals are communicated through the controller to the communication unit.

According to a further preferred embodiment of the present invention, the information is encrypted by the computer which is connected to the telephone, prior to being communicated through the PSTN. Additionally, in accordance with a preferred embodiment of the present invention, the information is decrypted by the computer which is connected to the telephone, after being received from the PSTN.

There is also provided, in accordance with a preferred embodiment of the present invention, a method for exchanging information between a first communication system and a second communication system. Each of the first and second communication systems includes at least a computer. The computer includes a communications interface. Each of the first and second communication systems is connectable to the PSTN and to a WAN. The method includes the steps of: a) dialling a first telephone call through the PSTN from the first communication system to the second communication system, b) sending a data block from the first communication system to the second communication system, wherein the data block includes at least data defining a call request, c) disconnecting the first telephone call between the first communication system and the second communication system, d) each of the first and second communication systems connecting to the WAN by dialing a second telephone call, wherein the second communication system uses the call request data of the data block for dialling the second telephone call, e) The first communication system connecting to the second communication system through the WAN and f) exchanging the information between the first communication system and the second communication system through the WAN.

There is also provided, in accordance with a preferred embodiment of the present invention, a method for exchanging information between a first communication system and a second communication system. Each of the first and second communications systems includes at least a computer. The computer includes a communications interface. Each of the first and second communication systems is connectable to the PSTN and to a WAN. The method includes the steps of: a) dialling a first telephone call through the PSTN from the first communication system to the second communication system, b) sending a data block from the first communication system to the second communication system, wherein the data block includes at least data defining a call request, c) disconnecting the first telephone call between the first communication system and the second communication system, d) each of the first and second communication systems connecting to the WAN by dialing a second telephone call, wherein the second communication system uses the call request data of the data block for dialling the second telephone call, e) The second communication system connecting to the first communication system through the WAN, by using data received during the first telephone call to obtain a WAN address of the first communication system and f) Exchanging the information between the first communication system and the second communication system through the WAN.

Further, in accordance with a preferred embodiment of the present invention, the data block further includes a caller identification data. The caller identification data includes a WAN address of the first communication system. The WAN address of the first communication system is used by the second communication system for connecting to the first communication system through the WAN.

Still further, in accordance with a preferred embodiment of the present invention, the data received during the first telephone call and used by the second communication system to obtain the WAN address of the first communication system is the standard telephony caller ID data which includes at least the telephone number associated with the first communication system. The caller ID data is communicated to the second communication system between the rings of the first telephone call. The second communication system obtains the WAN address of the first communication system from a look up table (LUT) stored by the second communication system.

In accordance with another preferred embodiment of the present invention, the method also includes, after the step of exchanging, the step of the first communication system and the second communication system disconnecting from the WAN.

In accordance with another preferred embodiment of the present invention, the data block of the step of sending is a fast format data block using a fast format data communication protocol.

Further, in accordance with an additional preferred embodiment of the present invention, the fast format data communication protocol is a DTMF communication protocol or a Bell 202 communication protocol or a Bell 103 communication protocol or a CCITT V.21 communication protocol or a CCITT V.23 communication protocol.

Still further, in accordance with an additional preferred embodiment of the present invention, the data block further includes data which identifies the first communication system.

Additionally, in accordance with yet another preferred embodiment of the present invention, the step of exchanging further includes the step of encrypting the information before exchanging it.

In accordance with another preferred embodiment of the present invention, the data block of the step of sending further includes a public key for decrypting encrypted information which was generated by the step of encrypting and exchanged by the step of exchanging.

Further, in accordance with an additional preferred embodiment of the present invention, the information which is exchanged in the step of exchanging is voice information or control information or data files or graphic information or video information or any combination thereof.

Additionally, in accordance with an additional preferred embodiment of the present invention, the information which is exchanged in the step of exchanging is analog information or digital information or a combination of analog information and digital information.

Still further, in accordance with another preferred embodiment of the present invention, the step of exchanging is selected from the group of steps consisting of: the step of transferring the information unidirectionally from the first communication system to the second communication system, the step of transferring the information unidirectionally from the second communication system to the first communication system and the step of bidirectionally transferring the information from the first communication system to the second communication system and from the second communication system to the first communication system.

Yet, according to an additional preferred embodiment of the present invention, at least one of the first communication system and the second communication system also includes at least one device for processing information which is connected to the computer. The device for processing information is a videophone device or a video-conferencing device or a sound card connected to a microphone and earphones or a sound card connected to a microphone and a speaker. The device for processing information inputs or outputs the exchanged information.

Additionally, in accordance with another preferred embodiment of the present invention, at least one of the first communication system and the second communication system also includes a WAN telephone which is connected to the computer and to a telephone line.

In accordance with yet another preferred embodiment of the present invention, at least one of the first communication system and the second communication system is a WAN telephone system.

BRIEF DESCRIPTION OF THE DRAWINGS

The present invention will be understood and appreciated more fully from the following detailed description taken in conjunction with the drawings in which:

FIGS. 2A and 2B are schematic block diagrams illustrating three different communication modes, using different communication routes for communication between the WAN telephone systems of FIG. 1 in accordance with a preferred embodiment of the present invention;

DETAILED DESCRIPTION OF A PREFERRED EMBODIMENT

Figure 1:
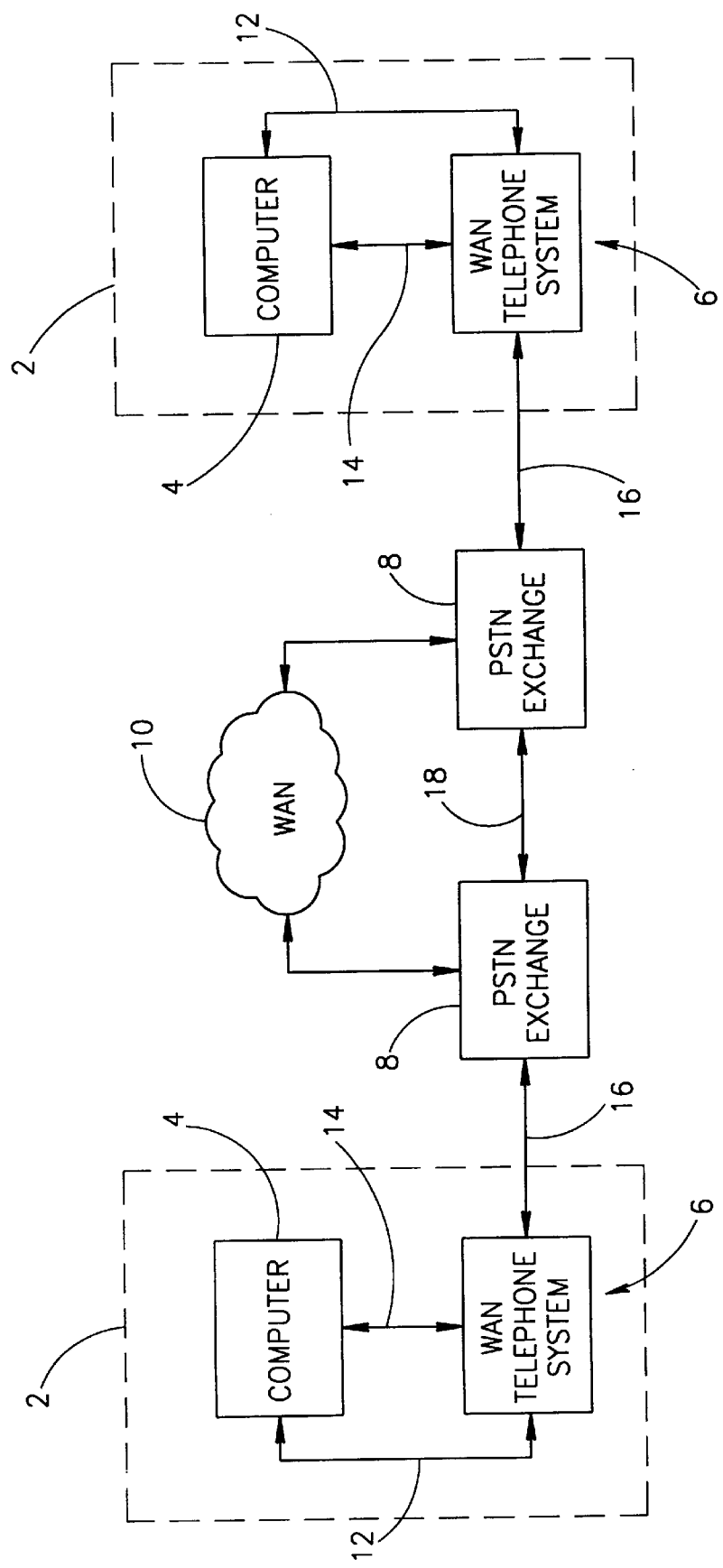
FIG. 1 is a schematic block diagram illustrating a pair of WAN telephone systems connected by two PSTN exchanges in accordance with a preferred embodiment of the present invention.

Reference is now made to FIG. 1 which is a schematic block diagram illustrating a pair of WAN telephone systems 6 communicating via local PSTN exchanges 8 in accordance with a preferred embodiment of the present invention. It is noted that blocks 2, shown in dashed lines, represent the user's local equipment for each of the two users.

The users local equipment 2 includes a WAN telephone system 6 communicatively connected to a computer 4 and to a primary telephone line 16, for communicating with another user's local equipment 2.

In accordance with a preferred embodiment of the present invention, the WAN telephone system 6 is connected to the computer 4 by a bidirectional data communication line 14 and by a modem line 12. Data communication line 14 can be any suitable bidirectional computer data communication line connectable to a suitable communication port of the computer 4, such as a serial communication port or a parallel communication port. The modem line 12 connects the WAN telephone system 6 with a suitable communications interface (not shown in FIG. 1 for clarity of illustration) operative in connecting the computer 4 to the PSTN or WAN, such as a modem or any other suitable communication interface connectable to the computer 4 and to a telephone line.

It is noted that, the modem connected to the computer 4 can be any type of suitable modem such as an external modem or an internal modem.

The communication between the WAN telephone systems uses the PSTN. Each WAN telephone system 6 is connected to a PSTN exchange 8 by the primary telephone line 16. The PSTN exchanges 8 can be interconnected by telephone carrier 18 representing the PSTN telephone carrier infrastructure, or by a WAN 10.

A communication link between the WAN telephone systems 6 can be established using three different operational modes, generally referred to as the direct mode, the WAN mode and the modem mode hereinafter.

It is further noted that for a better understanding, like components are designated by like reference numerals throughout the various figures.

Reference is now made to FIGS. 2A and 2B illustrating the three different operational modes. FIG. 2A illustrates the connection pathway of the direct mode, which is represented by a solid line, and the connection pathway of the WAN mode, which is represented by a dashed line. In the direct mode the WAN telephone systems 6 communicate by sending analog voice signals directly through the PSTN by using primary telephone lines 16 and the telephone carrier 18, bypassing computers 4. This mode is similar to a regular telephone conversation between regular telephone sets.

In the WAN mode, the analog voice signals are digitized and processed by the WAN telephone system's electronic circuits as will be disclosed in detail hereinafter. The digitized and processed data is sent to computer 4 through the bidirectional data communication line 14. The data is then output to the WAN telephone system through the modem line 12 and switched through primary telephone line 16 to the PSTN exchange 8 where it is communicated through the WAN 10 to another PSTN exchange 8. The data is then communicated from the PSTN exchange 8 through the primary telephone line 16 to the other user's WAN telephone system 6 where it is switched to the other user's computer 4 through modem line 12. The data is then communicated from the computer 4 back to the WAN telephone system 6 through the bidirectional data communication line 14. The data is then further processed to convert it to an analog voice signal, to which the recipient user can listen.

It is noted that while the three operational modes schematically illustrated in FIGS. 2A and 2B are shown as uni-directional for the sake of clarity of illustration, all the three modes are bidirectional and can be implemented using full-duplex or half-duplex operation.

FIG. 2B illustrates the connection pathway of the modem mode, which is represented by a solid line. In the modem mode, the WAN telephone systems 6 are used for controlling the computers 4 to transfer digital data between them through the modems. The user sends suitable control signals and digitized voice from the WAN telephone system 6 to computer 4 through the bidirectional data communication line 14. The control signals instruct the computer to establish a modem to modem link with the destination WAN telephone system 6, through the PSTN, and transfer digital data via the modem through modem line 12 to the WAN telephone system 6 where the data is switched through primary telephone line 16 to the PSTN exchange 8. The data is then switched to the destination PSTN exchange 8 through the telephone carrier 18. The data is then communicated through primary telephone line 16 to the destination WAN telephone system 6 where it is switched to the computer 4 through modem line 12. Additionally, the destination computer sends signals to the destination WAN telephone system 6 through bidirectional data communication line 14 for reporting the transfer of digitized voice data or other types of data, and transfers the digitized voice data to the destination WAN telephone system 6.

The modem mode is similar to a regular data transfer between two computers through modems except that in accordance with a preferred embodiment of the present invention, the user can control the data transfer directly from the WAN telephone interface without having to be near the computer.

It is noted that the digital data transferred between the computers 4 in the modem or WAN modes can be any type of digital data such as digitized voice data, Graphic data, digital video data or any other type of compressed or non-compressed data file.

It is further noted that a feature of the present invention is the ability of the computers 4 to scramble and descramble the digital data transferred between the modems in the modem or WAN modes. This has the advantage that the users can conduct a high security, scrambled, voice telephone conversation in the modem mode, thus protecting the conversation from interception and wiretapping. The high security scrambling of data transmission can also be used when the WAN telephone system 6 is used for initiating the transfer of other types of digital data such as a facsimile transmission between the computers 4 in the modem or WAN modes. Thus, the user of the WAN telephone system 6 enjoys the advantages of high security scrambled voice and data transmission by using the processing power of an existing computer, without having to purchase an expensive scrambling telephone instrument or expensive scrambling equipment.

Figure 3A:
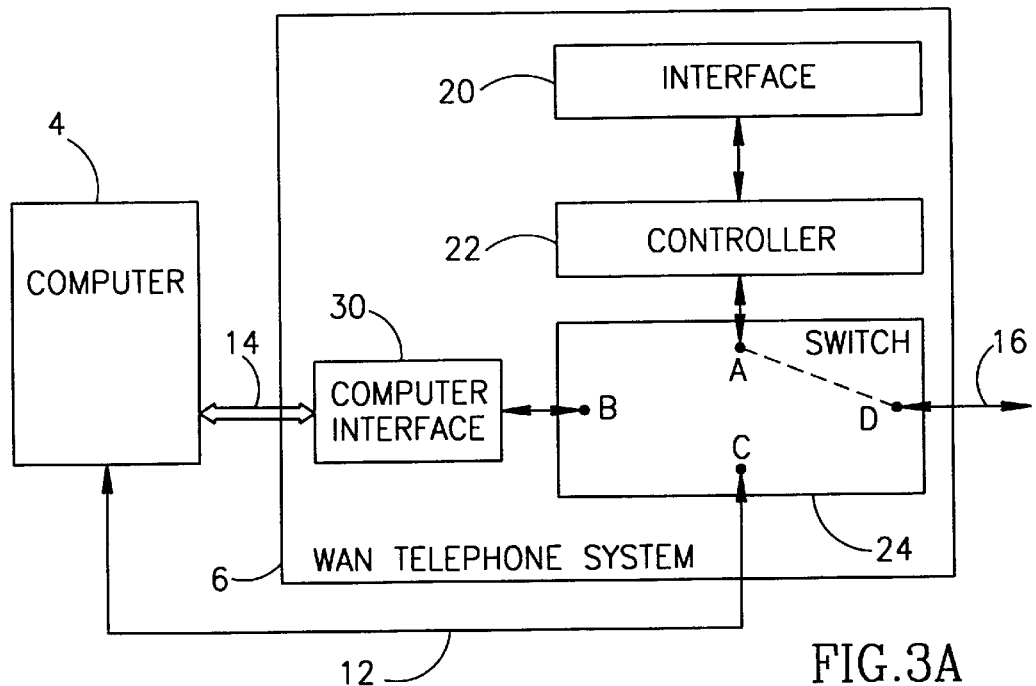
FIGS. 3A and 3B are schematic block diagrams illustrating the WAN telephone system of FIG. 1 in detail.
Figure 3B:
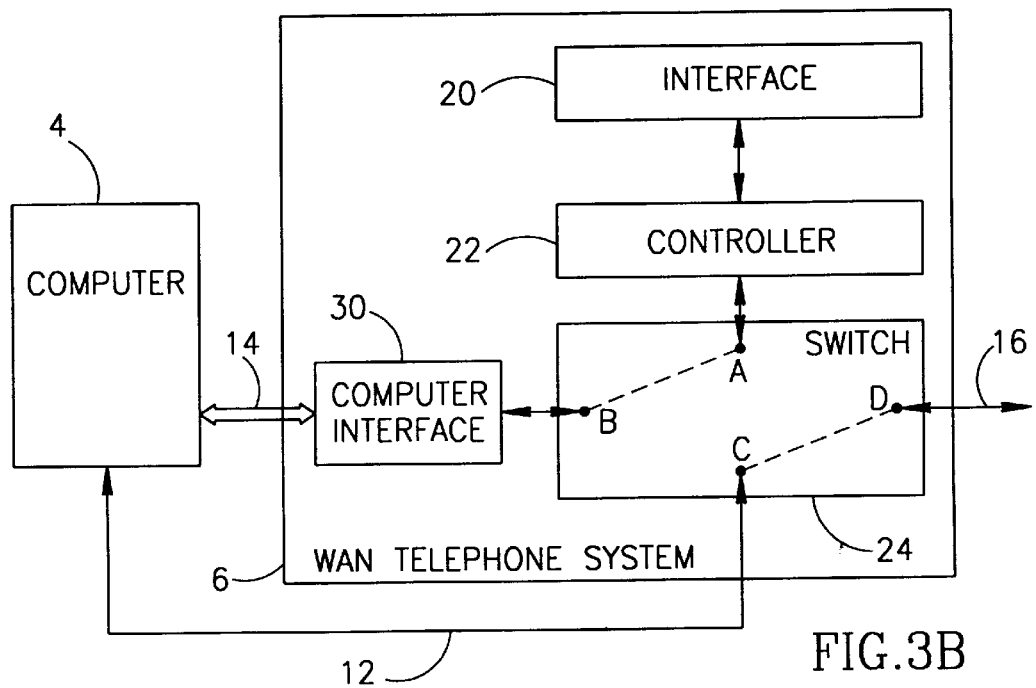

Reference is now made to FIGS. 3A and 3B, illustrating the WAN telephone system 6 of FIG. 1 in detail. FIG. 3A illustrates the WAN telephone system 6 which includes an interface 20 suitably connected to a controller 22 for transferring control signals, user voice or other types of data such as facsimile data to the controller 22.

The WAN telephone system 6 also includes a switch 24 suitably connected between the modem line 12, a computer interface 30, the controller 22 and the primary telephone line 16. The switch 24 is connected by modem line 12 to a modem (not shown) which is installed in the computer 4. The computer interface 30 connects the switch 24 to the computer 4 by the bidirectional data communication line 14. The switch 24 is further connected to the PSTN exchange 8 (FIG. 1) by the primary telephone line 16.

It is noted, that the computer interface 30 and the bidirectional data communication line 14 can be any suitable computer interface and bidirectional data communication line, respectively. For example, in accordance with a preferred embodiment of the present invention, the computer interface 30 can be a serial or parallel data communication interface and the bidirectional data communication line 14 can be a serial or parallel bidirectional communication line, respectively. The serial or parallel communication line is connected to the computer 4 using a serial or parallel communication port, respectively. In another exemplary embodiment of the present invention, the computer interface 30 is a suitable data bus interface and the bidirectional communication line 14 is connected to the data bus of the computer 4. It is noted that, in the latter exemplary embodiment the WAN telephone system 6 can also be implemented as a computer card connectable directly to an expansion slot of the data bus of the computer 4.

When the WAN telephone 6 is operative in the direct mode, switch 24 is switched to a first state, illustrated in FIG. 3A. It is noted that the dashed lines within the switch 24 in FIGS. 3A and 3B, schematically represent the internal connections within switch 24 in a specific switching state. In the first state, controller 22 is directly connected to the PSTN exchange 8 of FIG. 1 through the primary telephone line 16, bypassing computer 4. Thus, in the direct mode, the analog voice signal from the interface 20 is passed through the controller 22, switch 24 and primary telephone line 16 to the PSTN exchange 8.

When the WAN telephone 6 is operative in the WAN mode, switch 24 is switched to a second state, illustrated in FIG. 3B. In the second state, controller 22 is connected through computer interface 30 and the bidirectional communication line 14 to the computer 4, and the modem of the computer 4 is connected to primary telephone line 16 through modem line 12 and the switch 24. Thus, the modem of the computer 4 has access to the PSTN exchange 8 of FIG. 1.

It is noted that when the WAN telephone system 6 is in the WAN mode, the analog voice signal received from the interface 20 is digitized by the controller 22 and the digital data is passed to the computer 4 for processing. The digital voice data is then sent by the modem of the computer 4 as a modulated analog signal to the PSTN exchange 8.

It is also noted that when the WAN telephone system 6 is in the modem mode, control signals generated by the interface 20 are sent to the controller 22 which sends digital control data to the computer 4 over the bidirectional communications line 14 for initiating the transfer of selected digital data by the modem of the computer 4 as modulated analog signals communicated to the PSTN exchange 8 through modem line 12, switch 24 and primary telephone line 16.

It is further noted that, while the switch 24 is depicted as a four-pole switch (FIGS. 3A and 3B) for the sake of clarity of illustration, the switch 24 can be implemented differently for different preferred embodiments of the present invention. For example the dashed line shown connecting the switch poles labeled A and B in FIG. 3B can also represent a plurality of communication lines connecting the controller 22 with the computer interface 30, the exact number of lines being determined by the type of the computer interface 30. Thus, different numbers of digital communication lines can be used for connecting the controller 22 with a serial computer interface, a parallel computer interface or a data bus computer interface.

It is additionally noted that, while the switching action of connecting pole D of the switch 24 to pole A or alternatively to pole C (FIGS. 3A and 3B, respectively), can be implemented using a mechanical relay, an electronic switch or any other suitable switch implementation, the action of switching the connection between poles A and B of the switch 24 can be implemented by either using a physical switch such as a mechanical relay or electronic switch, or by using logical switching.

Logical switching can be implemented with the plurality of digital communication lines (schematically represented by the dashed line connecting poles A and B of the switch 24 of FIG. 3B) permanently connecting the controller 22 with the computer interface 30. The logical switching action is performed by the controller 22 by disabling the sending of digital signals through these permanently connected digital communication lines while the switch 24 is in the first state. When the switch 24 is in the second state the controller 22 enables the sending of digital signals through the plurality of permanently connected digital communication lines.

Figure 4:
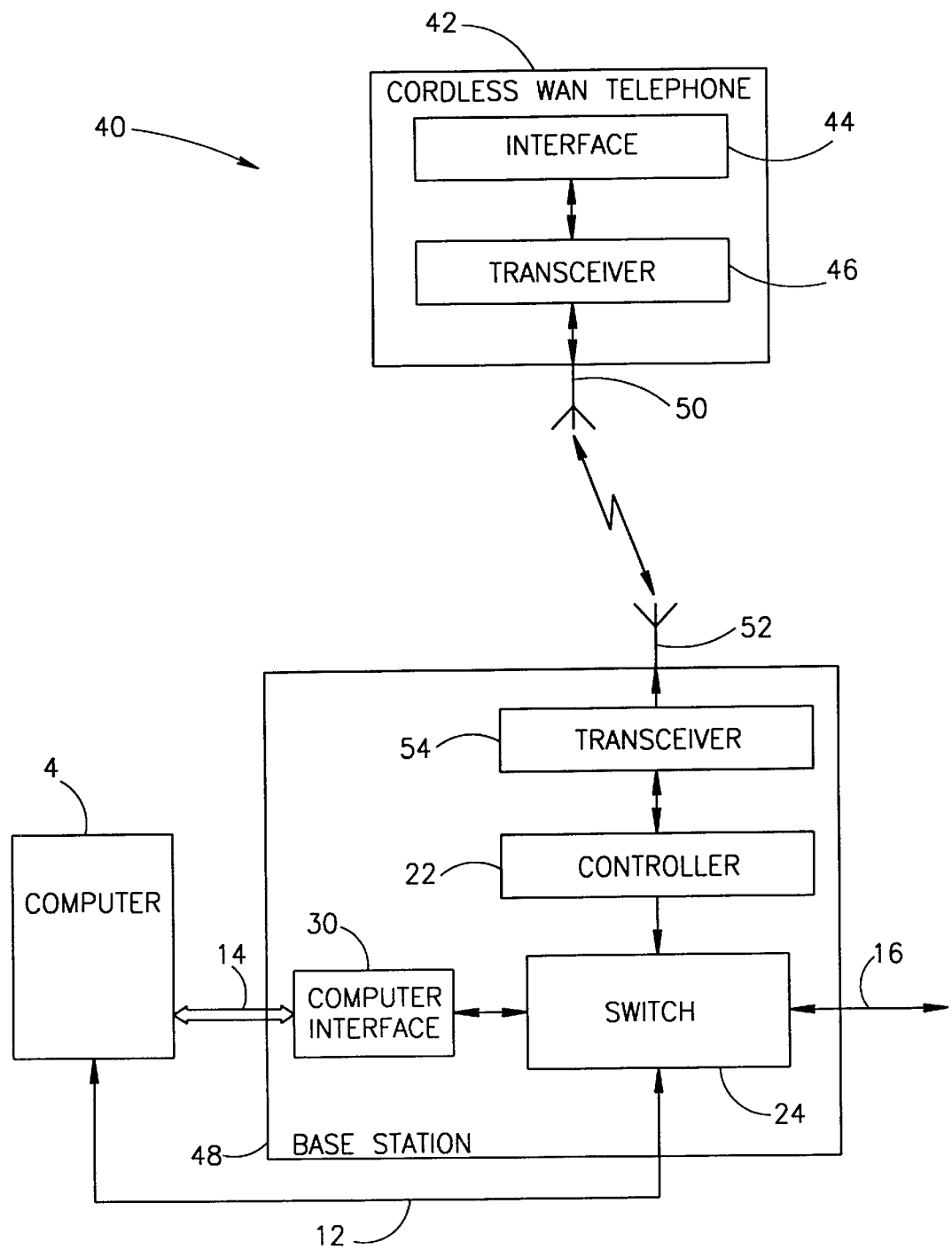
FIG. 4 is a schematic block diagram illustrating a cordless version of the WAN telephone system in accordance with a preferred embodiment of the present invention.

Reference is now made to FIG. 4 which illustrates a cordless WAN telephone system 40 in accordance with a preferred embodiment of the present invention.

It is noted that for a better understanding, like components are designated by like reference numerals throughout the various figures.

FIG. 4 illustrates a cordless WAN telephone system 40 in accordance with a preferred embodiment of the present invention. The WAN telephone system 40 includes a cordless handset 42 and a base station 48. The cordless handset 42 includes an interface 44 for receiving voice and control input from the user and for generating voice output or other suitable audio-visual outputs for informing the user of the operational status of the WAN telephone system 40, generating various user alerts and for prompting the user to supply the necessary input data. The interface 44 is suitably connected to a transceiver 46 which is connected to an antenna 50 for wireless communication of voice and control data between the cordless handset 42 and the base station 48.

The base station 48 includes an antenna 52 suitably connected to a transceiver 54 for voice and control data communication with the cordless handset 42. The base station 48 further includes a controller 22 suitably connected to a switch 24 for controlling the bidirectional flow of voice or digital data and control data between the cordless handset 42, the base station 48 and the computer 4, by suitably controlling the switching states of switch 24 as described and illustrated hereinabove. Switch 24 is connected to the computer 4 through computer interface 30 and bidirectional communication line 14 as described hereinabove.

In Accordance with a preferred embodiment of the present invention, the cordless hand set 42 and the base station 48 are implemented using 900 MHz band (902–928 MHz) spread spectrum transceivers. This technology which is based on Frequency Hopping or Direct Sequence, provides high security against eavesdropping and Jamming. Additionally, due to higher power allowed by the FCC in the U.S.A. at the 900 MHz band, the effective range of this technology is often more than 1,000 feet.

The WAN telephone system 40, thus has the advantage of enabling the user to perform a WAN telephone conversation without having to be near the computer 4. Another advantage of the present invention is the fact that the user does not have to use the computer 4 at all since all the necessary communication steps are automatically performed by the system and the user is required only to select the requested operational mode and supply the required telephone number. A further advantage of the present invention is the ability of the same handset to enable the user to perform various different communication types such as a regular direct telephone conversation, a high-security scrambled modem to modem telephone call, a long-distance or international voice telephone conversation using a WAN at a fraction of the cost of performing an equivalent direct telephone conversation, and additionally performing various remotely controlled data transfer operations by controlling computer 4, such as sending, printing or deleting a Facsimile messages or E-mail messages.

It is noted that, using a preferred embodiment of the present invention which implements spread spectrum technology in the modem mode, gives the user the highest degree of call security possible for this preferred embodiment. However, the user may at any moment switch to another mode of operation, choosing to perform a call in a mode which is less secure, but has other advantages such as reduced cost or faster response. Thus the user can select the most suitable mode of operation that fits best the purpose and requirements of each specific call.

It is further noted that while the preferred embodiment shown in FIG. 4 and described hereinabove provides the user with a high degree of call security while using a cordless telephone, other preferred embodiments of the present invention described in detail hereinafter can provide a similar degree of security by conducting a scrambled modem to modem call using a corded telephone.

Figure 5:
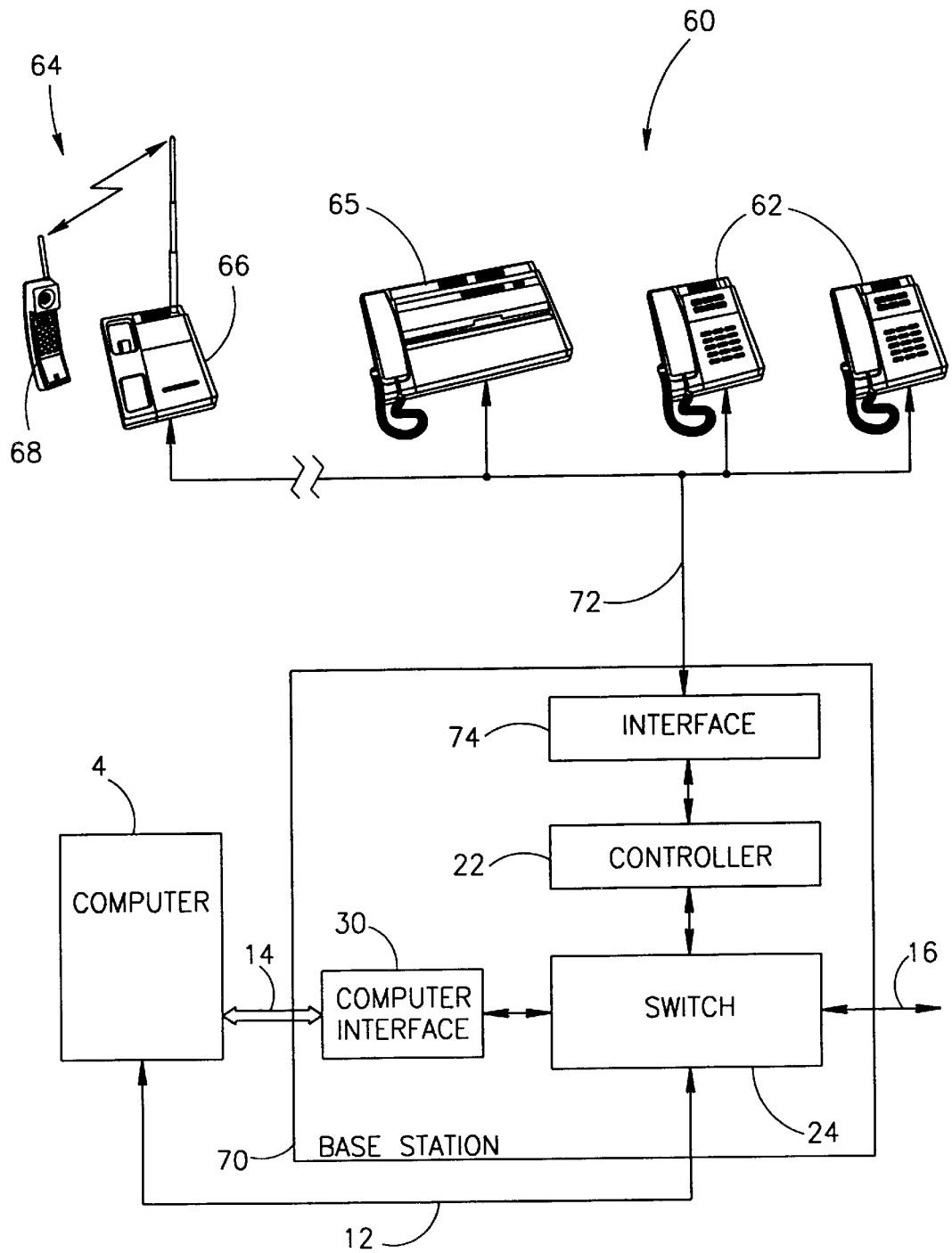
FIG. 5 is a schematic block diagram illustrating a version of the WAN telephone system including a base-station connectable to a plurality of regular telephone sets or facsimile machines in accordance with a preferred embodiment of the present invention.

Reference is now made to FIG. 5 illustrating a WAN telephone system 60 constructed and operative in accordance with a preferred embodiment of the present invention. The WAN telephone system 60 includes a plurality of local telephony devices such as regular telephones 62, regular cordless telephones 64 and a facsimile machine 65, each of the plurality of local telephony devices is connected to a telephone socket (not shown), all the telephone sockets being interconnected by the local in-house telephone line 72 available on the premises. Each of the regular cordless telephones 64 includes a base station 66 and a handset 68. The WAN telephone system 60 also includes a base station 70 connected through one of the telephone sockets (not shown) to each of the plurality of local telephony devices for bidirectionally communicating with one of the plurality of the local telephony devices. The base station 70 is also suitably connected to the computer 4.

The base station 70 includes an interface 74 connected between the local telephone line 72 and the controller 22 for bidirectionally communicating control data or voice data or other data types, such as facsimile data, between one of the plurality of regular telephones 62, regular cordless telephones 64 or the local facsimile machine 65 and the controller 22.

The base station 70 also includes a switch 24 and a computer interface 30 for controlling communications and data flow between the controller 22 and the computer 4 as described in detail hereinabove. The switch 24 is connected to the computer 4 through the computer interface 30 and the bidirectional data communication line 14. The switch 24 is also connected to the computer 4 by modem line 12 as described hereinabove. The switch 24 is also connected to primary telephone line 16.

In accordance with an aspect of a preferred embodiment of the present invention the user can operate the WAN telephone system 60 each of the plurality of regular or cordless telephones 62 and 64, respectively, or from the local facsimile machine 65 by dialing selected serial key combinations, using the keyboard of the regular telephone 62 or the cordless telephone 64 or the local facsimile machine 65.

An advantage of this feature of the present invention is the ability of the user to utilize any existing regular corded or cordless telephones connected to any standard telephone socket within the premises to operate the system through base station 70. Thus the user can operate the WAN telephone system 60 from any room containing a regular corded telephone or alternatively from anywhere in the premises within the reception range of a regular cordless telephone handset.

It is noted that, while the WAN telephone system 60 of FIG. 5 includes two regular telephones 62 one cordless telephone 64 and one local facsimile machine 65 connected to the base station 70, the WAN telephone system 60 can include other different combinations of local telephony devices such as regular telephones, cordless telephones or facsimile machines. For example, an exemplary embodiment of the WAN telephone system 60 can include one regular telephone 62, another exemplary embodiment of the WAN telephone system 60 can include one cordless telephone 64 and one local facsimile machine 65.

It is noted that in accordance with a preferred embodiment of the present invention, the serial key combinations used in operating the WAN telephone system can be predetermined or programmable by the user.

The interface 74 suitably translates the keyboard combination sent by one of the local telephony devices into suitable control signals which are sent to the controller 22 for controlling the bidirectional flow of voice analog signals, control signals and data between the local telephony device, the WAN telephone system 60 and the computer 4 as described in detail hereinafter.

It is further noted that in accordance with the preferred embodiment of the present invention illustrated in FIG. 5, when the regular cordless telephone 64 is used to conduct a scrambled call, the call will not be of the high-security type unless the cordless telephone 64 employs a high-security technology such as spread spectrum technology or any other suitable technology to prevent eavesdropping to and jamming of the cordless telephone transmissions. However the high-security scrambled call can still be achieved by simply using a regular corded telephone 62.

Figure 6:
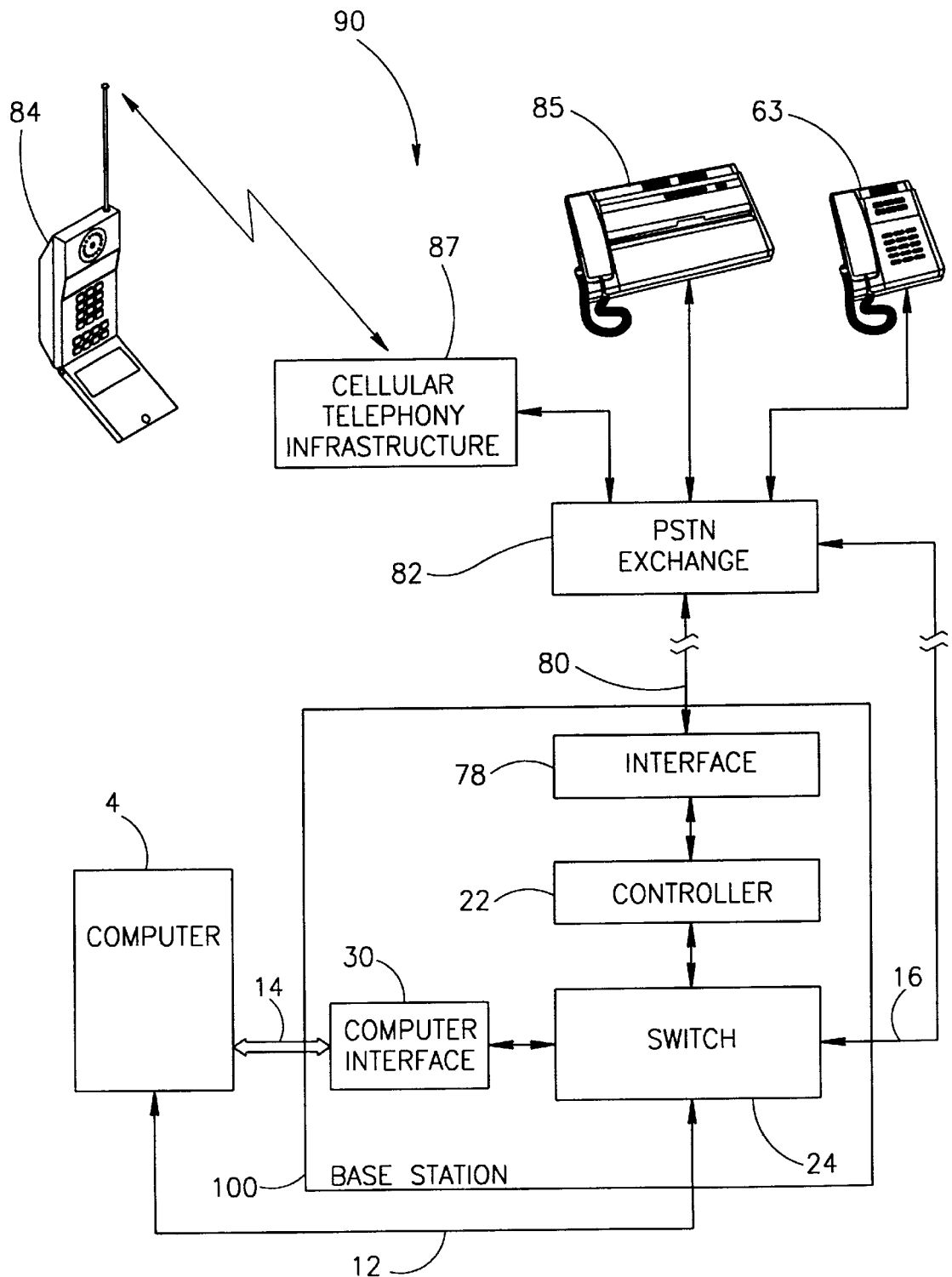
FIG. 6 is a schematic block diagram illustrating a version of the WAN telephone system connectable to two telephone lines and remotely operable from a regular or a cellular telephone or a facsimile machine in accordance with an preferred embodiment of the present invention.

Reference is now made to FIG. 6 illustrating a WAN telephone system 90, connectable to two telephone lines and remotely operable from a remote telephony device such as a regular telephone 63 or a cellular telephone 84, or a remote facsimile machine 85, in accordance with a preferred embodiment of the present invention.

The WAN telephone system 90 includes a base station 100 connectable to a PSTN exchange 82 by a primary telephone line 16 and a secondary telephone line 80. The base station 100 is also connectable to a computer 4 by a modem line 12 and a bidirectional data communication line 14 as described hereinabove.

The base station 100 includes an interface 78 connected between the PSTN exchange 82 and the controller 22 for communicating with a remote telephony device using the secondary telephone line 80. An incoming call can be performed using the regular remote telephone 63 or the regular cellular telephone 84 or the remote facsimile machine 85 suitably connected to the PSTN. The base station 100 further includes a switch 24, a computer interface 30 and a bidirectional data communication line 14, connected and operable as described hereinabove and illustrated in FIGS. 4 and 5.

In accordance with a preferred embodiment of the present invention, the user can remotely operate the WAN telephone system 90 by calling the appropriate telephone number associated with the secondary telephone line 80 from the remote regular telephone 63 or from the cellular telephone 84 using the cellular telephony infrastructure 87 or from the remote facsimile machine 85, and then dialing certain serial key combinations on the regular remote telephone 63 or the cellular telephone 84 or the remote facsimile machine 85, for initiating different types of calls using the different modes of the WAN telephone system. The key combinations can be predetermined or programmable by the user.

The interface 78 suitably translates the keyboard combinations dialed from the remote regular telephone 63 or the cellular telephone 84 or the remote facsimile machine 85 into suitable signals which are sent to the controller 22 for controlling the bidirectional flow of control signals and data between the remote telephony device such as the remote regular telephone 63 or the cellular telephone 84 or the remote facsimile machine 85, the base station 100 and the computer 4. The call is then routed either directly through the first telephone line 16 to the PSTN (in a direct mode call) or through the modem of computer 4 via modem line 12, switch 24 and the first telephone line 16 to the PSTN (in a WAN call or modem call).

An advantage of this preferred embodiment of the present invention is that the user can perform different call types through his WAN telephone system 90 by remotely operating the WAN telephone system 90 from any regular telephone located anywhere. or from a cellular telephone which is connected to the PSTN.

It is noted that while FIG. 6 illustrates both primary and secondary telephone lines 16 and 80, respectively, as connected to the same PSTN exchange 82, these two telephone lines may each be connected to a different PSTN exchange.

Figure 7:
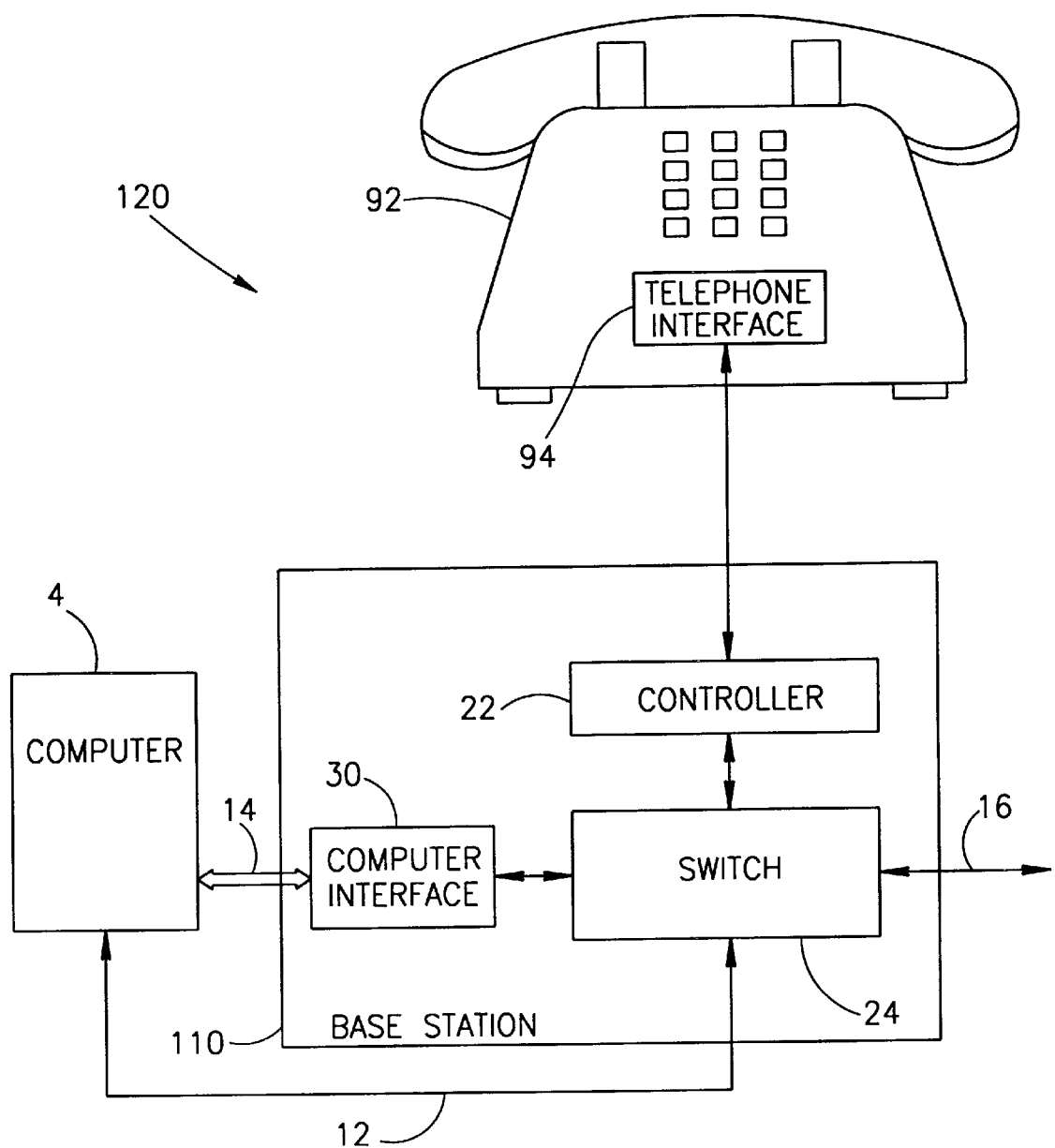
FIG. 7 is a schematic block diagram illustrating a version of the WAN telephone system including a base-station and a WAN telephone set in accordance with a preferred embodiment of the present invention.

Reference is now made to FIG. 7 which illustrates a WAN telephone system 120 constructed and operative in accordance with an additional preferred embodiment of the present invention. WAN telephone system 120 includes a corded WAN telephone 92 suitably connected to a base station 110. The base station 110 includes a controller 22 connected between the corded WAN telephone 92 and a switch 24 for controlling the routing of analog voice signals, control signals and digitized data between the base station 110, the corded WAN telephone 92 and a computer 4. The corded WAN telephone 92 includes a telephone interface 94 directly connected to the controller 22 of the base station 110 for communicating the users analog voice signals and control signals thereto. The operation of the wan telephone system 120 is similar to the operation of the WAN telephone 40 of FIG. 4, except that the corded WAN telephone is connected directly to the controller 22 of the base station 110, thus obviating the need for the transceivers 46 and 54 and the antennas 50 and 52 of WAN telephone system 40. The WAN telephone system 120 has the advantage of offering the user the same range of easy to operate modes of communication without the additional cost of the feature of cordless operation. This preferred embodiment of the present invention is advantageous for users who do not need the ability to remotely control the system as disclosed in the embodiment of FIG. 6, nor the ability to use a plurality of regular or cordless telephones for operating the system as disclosed in the preferred embodiment of FIG. 5, but wish to use the simpler operation afforded by the WAN telephone user interface.

It is noted that the telephone instruments 63, 64 and 84 and the facsimile machines 65 and 85 communicating with the different base stations (including base stations that are implemented as a computer add-on cards) must be using the tone system and a DTMF protocol. However, the cordless handset 42 and the WAN telephone 92, can use any suitable communication protocol such as a DTMF protocol or a serial communication protocol or a parallel communication protocol or any other suitable digital communication protocol.

Reference is now made to FIGS. 8A, 8B, 9A, 9B and 9C which are schematic flow charts illustrating the method of operation of the WAN telephone systems of FIGS. 1, 2A, 2B, 3A, 3B, 4, 5, 6, and 7 when they are operably connected to the computer 4 in accordance with a preferred embodiment of the present invention.

Figure 8A:
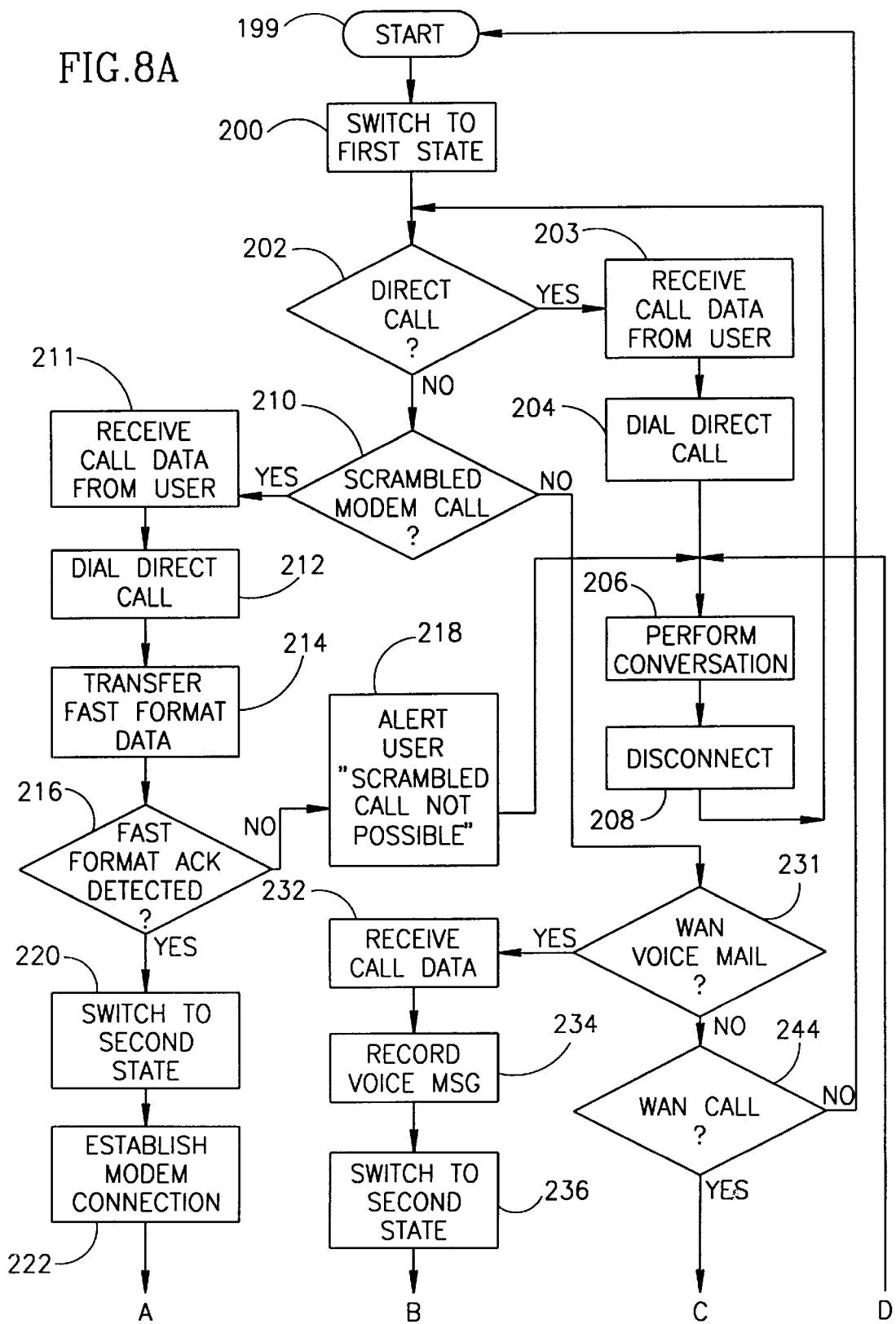
FIGS. 8A and 8B are schematic flow charts illustrating in detail the steps and the control flow of the method of handling outgoing calls in the WAN telephone system in accordance with a preferred embodiment of the present invention.
Figure 8B:
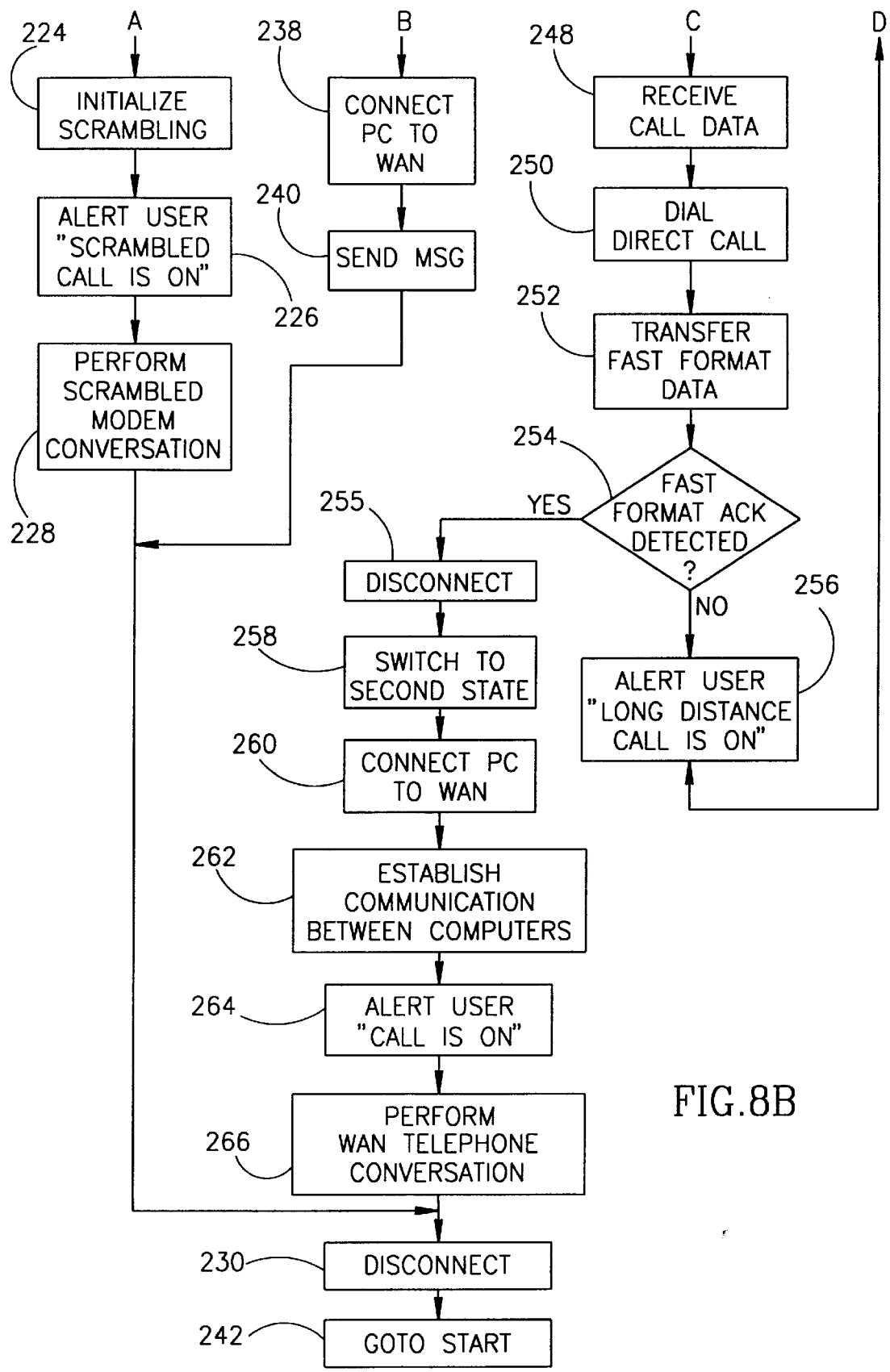

FIGS. 8A and 8B illustrate in detail the steps of a method for performing outgoing calls from a WAN telephone system in accordance with a preferred embodiment of the present invention.

When the WAN telephone system is switched on it automatically switches the switch 24 to the first state (step 200). the system checks the control signal initiated by the user (step 202). If the signal is a direct call signal the system receives the call data keyed in by the user (step 203) dials a direct call (step 204), the user performs the telephone conversation (step 206). At the end of the telephone conversation the user disconnects the call (step 208) and the system transfers control to step 202 (step 209).

If the system does not detect a direct call control signal, the system further checks the control signal (step 210). If the system detects a scrambled call control signal, the system receives the call data keyed in by the user (step 211) and dials a direct call (step 212). After the connection is established the system transfers data to the destination telephone using a fast format data transfer protocol (step 214).

The fast format data transfer protocol can be any communication protocol suitable for transferring a relatively short data block from a WAN telephone system to another WAN telephone system, while minimizing the direct call time which is required for achieving synchronization between the two WAN telephone systems, such as the Bell 103 or the Bell 202 or the DTMF or a CCITT V.21 or a CCITT V.23 communication protocol. This particular feature of the present invention enables the WAN telephone systems to minimize the time spent on direct long-distance calls and consequently to reduce the cost of the relatively more expensive long-distance component of the telephone calls.

The fast format data block includes at least a request for a call which informs the destination WAN telephone system whether the type of call requested by the calling WAN telephone system is a direct scrambled call or a WAN call.

The fast format data block can also include additional information containing caller identification data such as the caller's name or the caller's telephone number or the caller's E-mail address or any other caller related data for supplying the destination user with information about the caller.

The fast format data block can also include a Public Key data which may be required for data encryption in the direct scrambled call or for data encryption in the WAN call. It is noted that the scrambling or the encryption methods used by the WAN telephone system can be any suitable scrambling or encryption methods. It is also noted that the fast format data block can include more than one Public Key for encryption.

The system then checks whether a fast format acknowledge (ACK) signal is received the destination telephone (step 216). If the system does not receive a fast format ACK signal within a predetermined time interval or if the system receives a fast format negative acknowledge (NACK) signal, the system interprets this as an indication that the destination telephone is unable to perform descrambling and alerts the user that a scrambled call cannot be accomplished (step 218) the user then may conduct an unscrambled telephone conversation (step 206).

If a fast format ACK signal is received within the predetermined time interval the system switches the switch 24 to the second state (step 220) and proceeds to establish a modem to modem connection between the computer 4 connected to the calling WAN telephone system and the computer 4 connected to the destination WAN telephone system (step 222). Once the modem to modem connection is established the system initializes a scrambling protocol (step 224) and alerts the user that a scrambled call is on (step 226). The user can then proceed with a conversation (step 228). After the system receives a disconnect signal the system disconnects the line (step 230) and returns control to the starting point 199.

If the system does not detect a scrambled call control signal, the system further checks whether the control signal is a WAN voice mail control signal (step 231). If the system detects a WAN voice mail control signal the system receives the call data from the user (step 232). the system then records a voice message from the user (step 234), switches to the second state (step 236), connects the computer 4 to the WAN (step 238) and sends the message to the destination WAN address using the call data supplied by the user (step 240). The system then disconnects the connection (step 230) and returns control to the starting point 199 (step 242).

If The system does not detect a WAN voice mail control signal, the system further checks whether a WAN call control signal is detected (step 244). If the system does not detect a WAN call control signal, the system transfers control to the starting point 199. If the system detects a WAN call control signal, the system receives the call data from the user (step 248), dials a direct call (step 250) and initiates a fast format data transfer (step 252). The system then checks for a fast format ACK signal from the destination telephone (step 254). If the system does not detect a fast format ACK signal within a predetermined amount of time or if the system detects a fast format NACK signal, the system alerts the user that a long-distance call is on (step 256) and the user can continue by performing a long-distance conversation (step 206). If the user does not wish to conduct a long-distance conversation the user disconnects (step 208) and the system transfers control to step 202.

If the system detects an ACK signal, the system disconnects (step 255), switches switch 24 to the second state (step 258), connects the computer 4 to the WAN (step 260) and establishes communication between the calling and the destination computers 4 by using the WAN address of the destination computer (step 262). The system then alerts the user that a WAN call is on (step 264) and the user performs the WAN telephone conversation (step 266). At the end of the WAN telephone conversation the user disconnects (step 230) and the system transfers control to the starting point 199 (step 242).

It is noted that the system receives the WAN address of the destination computer either from the user who directly keys in the WAN address or alternatively by using the telephone number that was used for the direct dialing and a look up table (LUT) which is stored in the computer 4. The LUT can contain a list of telephone numbers linked with the names, WAN addresses and other information associated with the telephone numbers such as an indication identifying a certain telephone number as a fax number. Thus, when the user dials a certain telephone number and specifies a WAN call, the computer can find the required WAN address from the LUT. If the dialed telephone number is not found in the LUT or if there is no corresponding WAN address associated with it in the LUT and the user did not initially supply the WAN address, the user is prompted to supply the WAN address by inputing it on the user interface.

Figure 9A:
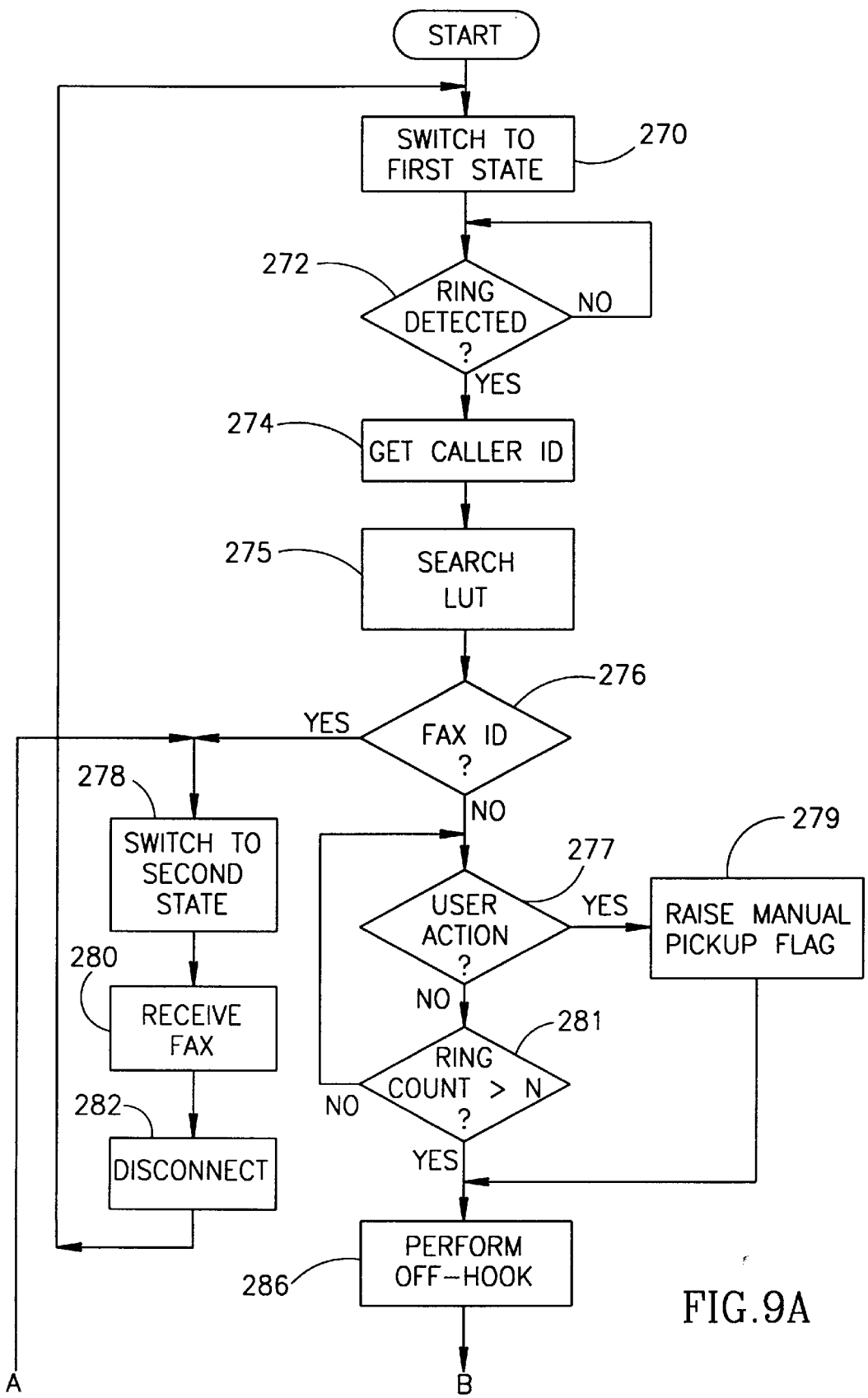
FIGS. 9A, 9B and 9C are schematic flow charts illustrating in detail the steps and the control flow of the method of handling incoming calls in the WAN telephone system in accordance with a preferred embodiment of the present invention.
Figure 9B:
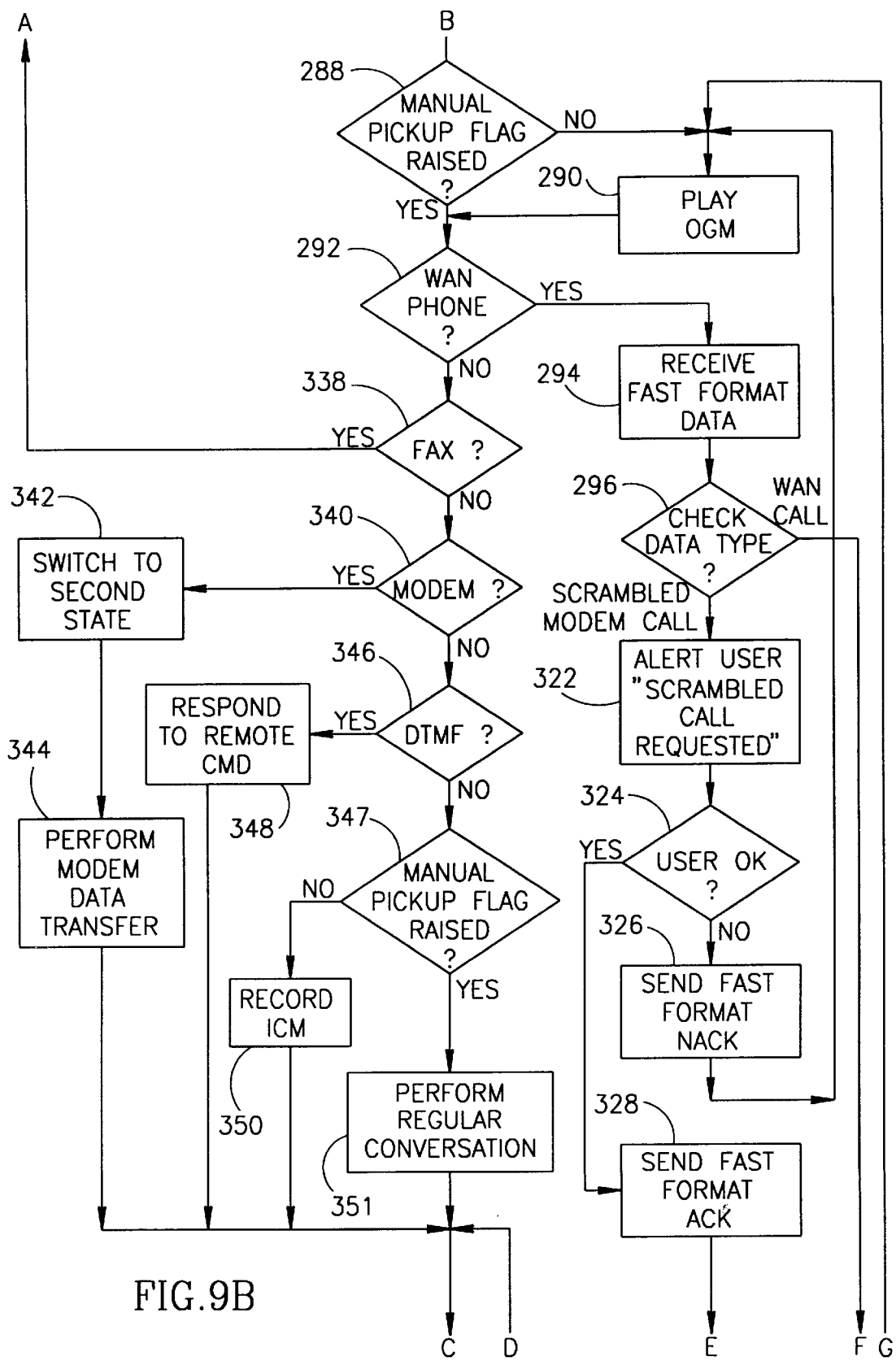
Figure 9C:
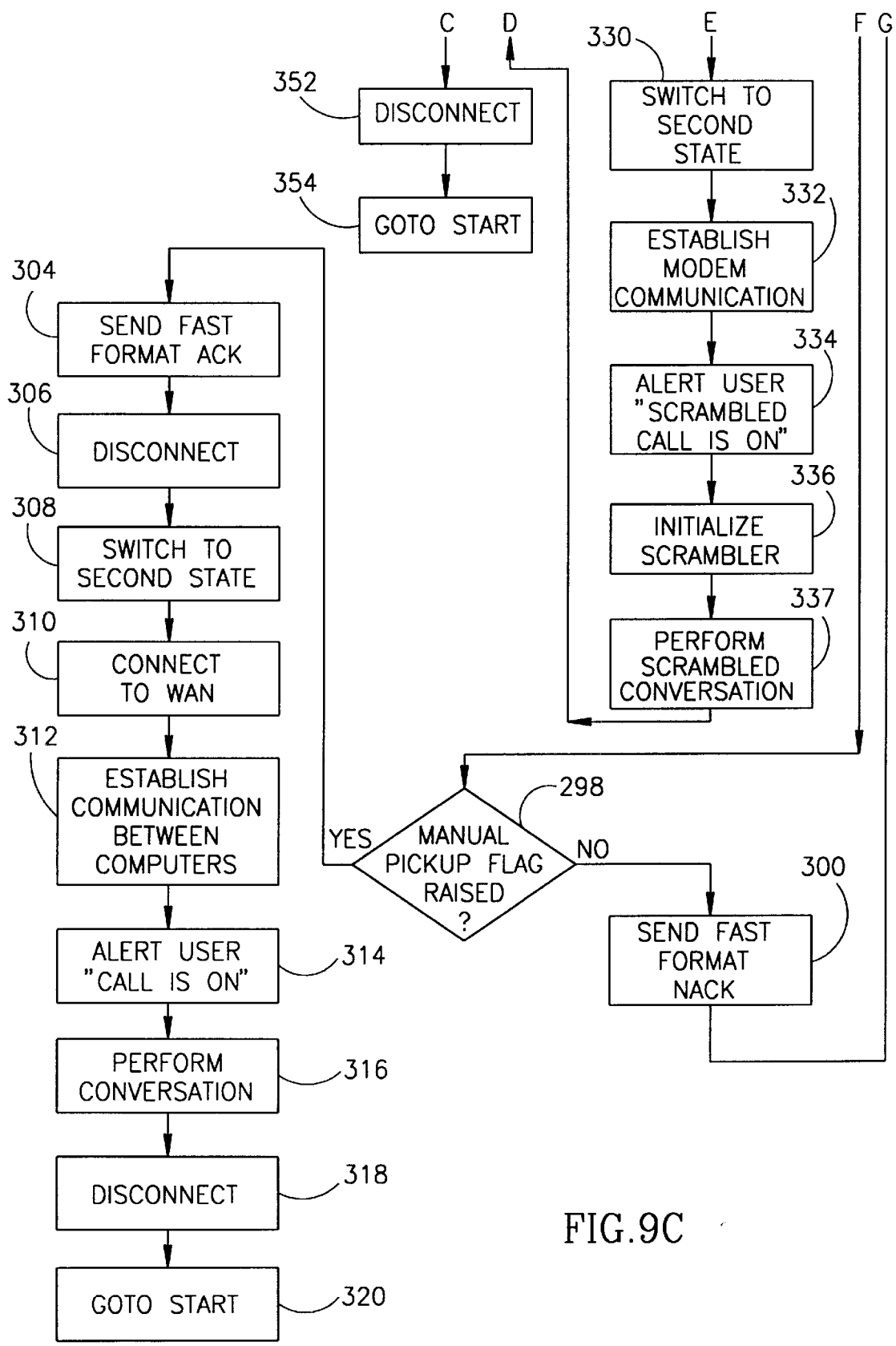

FIGS. 9A, 9B and 9C illustrate in detail the steps of the method used by the different embodiments of the WAN telephone system for detecting and responding to incoming telephone calls in accordance with a preferred embodiment of the present invention.

When the WAN telephone system is switched on it automatically switches the switch 24 to the first state (step 270). the system checks whether a ring signal is detected (step 272). If a ring signal is not detected, the system repeats the check. If a ring signal is detected, the system receives the Caller ID (step 274). The system then searches the LUT stored in the computer 4 for finding out whether the telephone number received in the Caller ID is stored in the LUT (step 275), The system checks whether the telephone number received in the Caller ID is defined as a fax number in the LUT (step 276). If the caller ID is defined as a fax number, the system switches switch 24 to the second state (step 278), receives the incoming facsimile data (step 280), disconnects (step 282) and returns control to control to step 270.

If the caller identification is not available or not defined as a fax number in the database, the system checks whether there was a manual pick up performed by the user, for example by the user pressing on the "talk" button (step 277). If a manual pick up is detected, the system raises the manual pick up flag (step 279) and transfers control to step 286. If a manual pick up is not detected, the system checks whether the ring count is larger than N, where N is a user determined number (step 281). If the ring count is not larger than N the system transfers control to step 277. If the ring count is larger than N the system transfers control to step 286. The system performs an off-hook (step 286) and checks whether the manual pickup flag is raised (step 288). If the manual pickup flag is not raised, the system plays an outgoing message (step 290).

The outgoing message (OGM) can be any outgoing message which is prerecorded by the user or a message selected out of a plurality of prerecorded messages stored by the computer 4. After the system plays the OGM or if a manual pickup is detected, the system checks the remote caller type (step 292) by checking the received remote caller control signal.

It is noted that the remote caller control signal can be any type of suitable signal such as a tone control signal. If the remote caller's control signal is a WAN telephone control signal, the system receives the fast format data sent by the calling WAN telephone (step 294) and checks the fast format data (step 296). If the fast format data indicates that a WAN call is requested, the system checks whether the manual pickup flag is raised (step 298, FIG. 9C). If the manual pickup flag is not raised, the system sends a fast format negative acknowledge (NACK) signal to the caller, thus, indicating that the requested WAN call cannot be completed (step 300) and transfers control to step 290 (FIG. 9B). If the manual pickup flag is raised, indicating that the telephone has been picked up by the user, the system sends a fast format ACK signal to the caller (step 304), disconnects (step 306), and switches the switch 24 to the second state (step 308). The system then connects to the WAN (step 310) and establishes communication between the computers 4 connected with the receiving and the calling WAN telephone systems (step 312). The system alerts the user that a WAN call is on (step 314) and the user proceeds to conduct the WAN telephone conversation (step 316). At the end of the WAN telephone conversation the user disconnects (step 318) and the system returns control to the starting point (step 320).

If at step 296 (FIG. 9B) the data type checked by the system indicates that a modem to modem scrambled call is requested, the system alerts the user that a scrambled call is requested (step 322), and checks whether the user has signalled his accepting the performing of a scrambled call (step 324). For example, the user can signal his accepting of the performance of the scrambled call by pressing a specific key on the telephone, but any other suitable form of signalling can be used. If the system detects no user acceptance signal, the system sends a fast format NACK signal to the caller (step 326) and transfers control to step 290. If the system detects a user acceptance signal, the system sends a fast format ACK signal to the caller (step 328), switches the switch 24 to the second state (step 330) and establishes a modem to modem communication between the modems of the computers 4 of the calling and receiving WAN telephone systems (step 332). The system alerts the user that a scrambled call is on (step 334) and initializes the scrambling and descrambling procedures (step 336). The user performs the scrambled conversation (step 337), disconnects (step 352) and the system transfers control to the starting point (step 354).

At step 292 of checking the remote caller control signal if the system does not detect a WAN telephone control signal it further checks the control signal (step 338). If a facsimile control signal is detected, the system transfers control to step 278 for receiving the facsimile data. If a facsimile control signal is not detected, the system further checks the control signal (step 340). If the system detects a modem control signal, the system switches switch 24 to the second state (step 342) and initializes a modem data transfer using the modem of the computer 4 (step 344). After data transfer is completed, the system disconnects (step 352) and transfers control to the starting point (step 354).

If the system does not detect a modem control signal in step 340, the system further checks the type of the remote caller (step 346). If the system detects a DTMF control signal, coming from a remote telephone, the system responds to a remote command (remote CMD) by performing various tasks in accordance with the DTMF control signals received from the remote caller (step 348). For example the system can replay previously recorded messages, or accept new outgoing messages or activate home appliances, for example an air conditioner, or place a WAN call through the primary telephone line 16. The system then disconnects (step 352) and transfers control to the starting point (step 354).

If the system does not detect a DTMF control signal at step 346, the system checks whether the manual pickup is raised (step 347). If the manual pickup flag is not raised, the system initiates the recording of an incoming message (ICM) from the caller (step 350). After the ICM is recorded the system disconnects (step 352) and transfers control to the starting point (step 354).

Finally, If the manual pickup flag is raised, the user performs a regular telephone conversation (step 351), disconnects (step 352), and the system returns control to the starting point (step 354).

Figure 10:
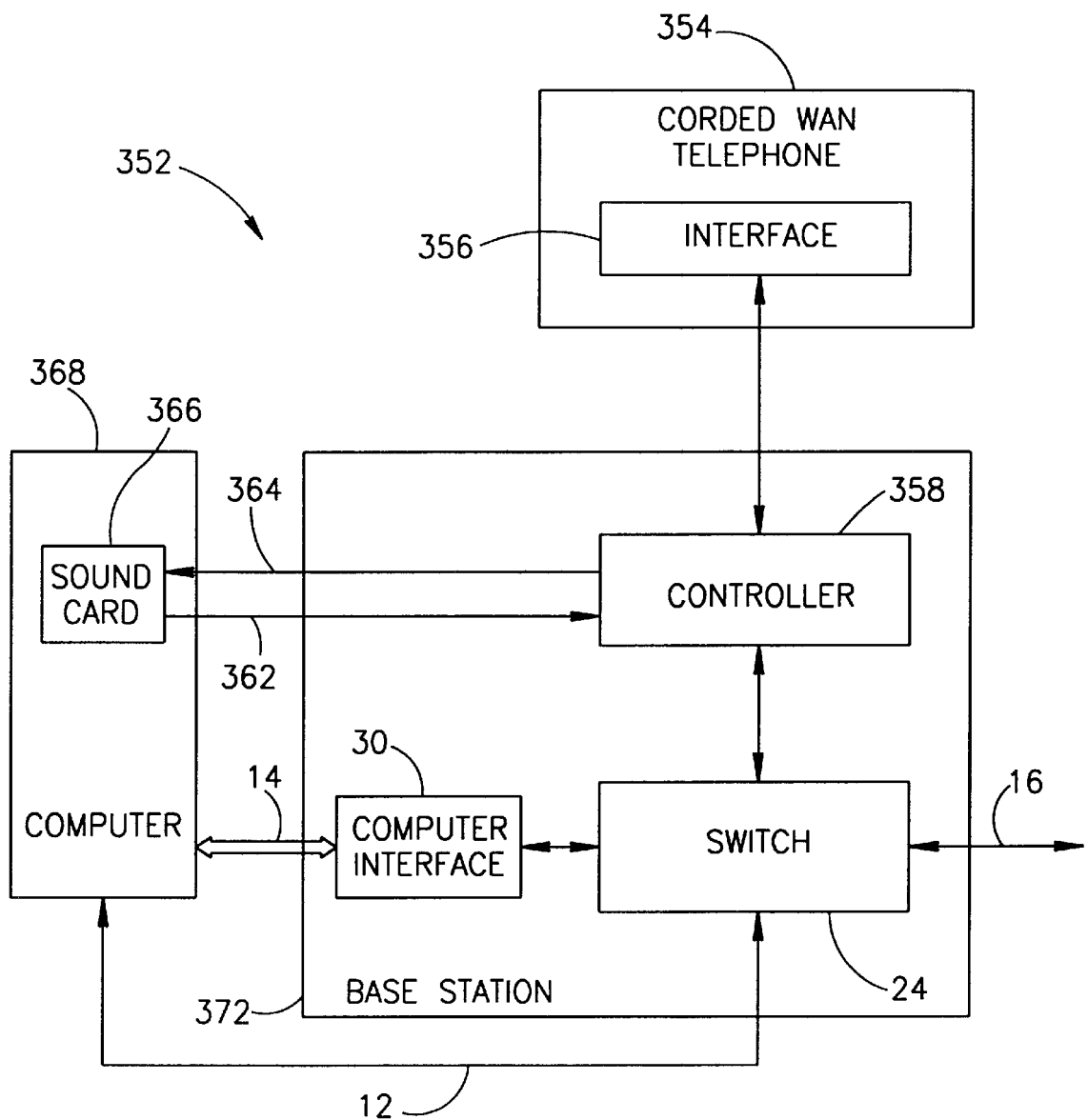
FIG. 10 is a schematic block diagram illustrating a WAN telephone system in accordance with an additional preferred embodiment of the present invention.

Reference is now made to FIG. 10 which illustrates a schematic block diagram of a WAN telephone system 352 in accordance with a preferred embodiment of the present invention.

The WAN telephone system 352 includes a corded WAN telephone 354 and a base station 372 suitably connected to the WAN telephone 354. The base station 372 is suitably connected to a computer 368 for communicating analog voice signals, digitized voice data, control signals and other types of digital data between the base station 372 and the computer 368.

A particular feature of this embodiment of the present invention is that the computer 368 includes a sound card 366. The WAN telephone 354 includes an interface 356. The base station 372 includes a controller 358 suitably connected to the interface 356 for communicating analog voice signals and digital or analog control signals between the interface 356 of the WAN telephone 354 and the controller 358.

The controller 358 is suitably connected to a switch 24 which is connected to the computer 368 through a computer interface 30 and a bidirectional digital communication line 14 for communicating digital control signals and digital data between the computer 368 and the controller 358. The switch 24 is also connected through a modem line 12 to a modem (not shown for the sake of clarity of illustration) installed in the computer 368 for communicating analog data signals between the modem of the computer 368 and the modem of another remote computer (not shown), through the switch 24, the primary telephone line 16 and the PSTN or a WAN.

The controller 358 is also connected to the sound card 366 of the computer 368 by an analog input line 364 and an analog output line 362. Thus the analog voice signal from the interface 356 is communicated to the sound card 366 by the analog input line 364 and the sound card performs the A/D conversion of the analog voice signal. Additionally the sound card 366 performs the necessary D/A conversion of the digital voice data received by the modem of computer 368 and sends the analog voice signal to the interface 356 through the analog output line 362 and the controller 358. Thus, the A/D and D/A conversions are performed by the sound card 366 and not by the controller 358.

Figure 11:
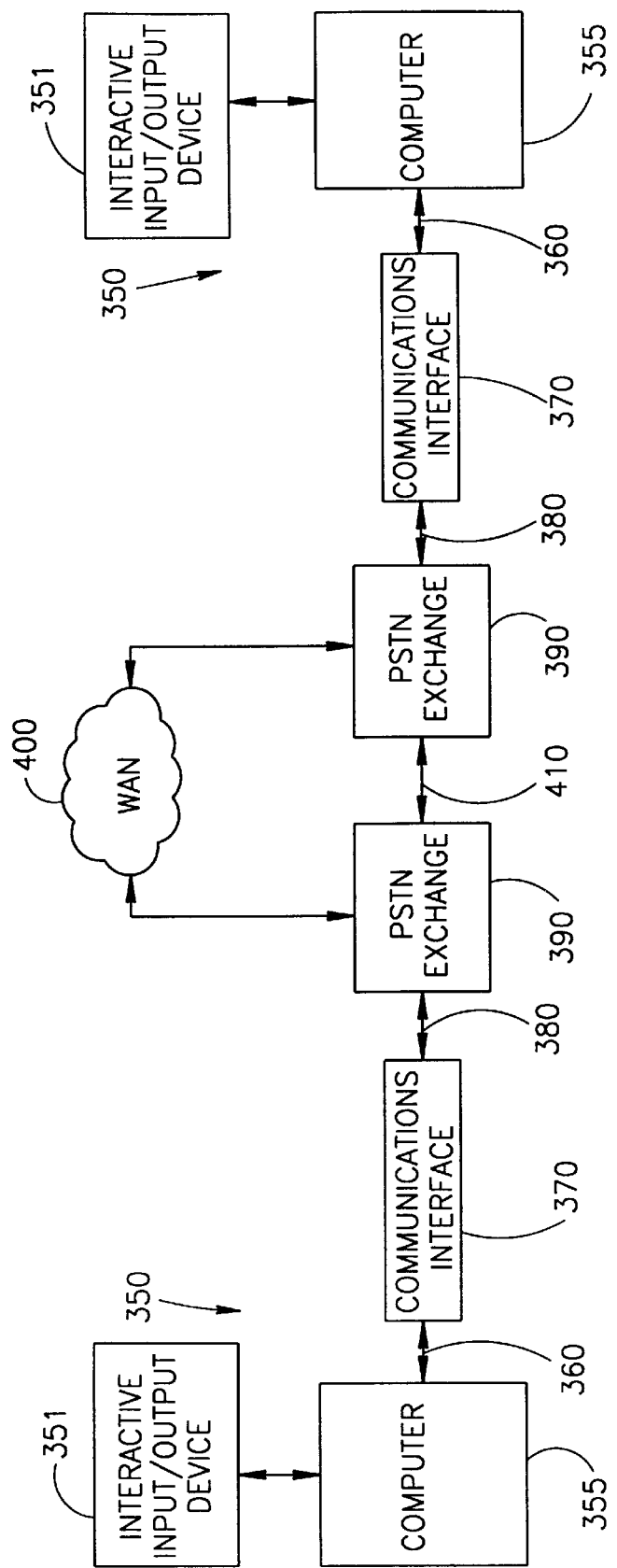
FIG. 11 is a schematic block diagram illustrating a pair of WAN telephone systems connected by two PSTN exchanges in accordance with an additional preferred embodiment of the present invention.

Reference is now made to FIG. 11 which illustrates two WAN telephone systems 350 connected by two PSTN exchanges 390 in accordance with an additional preferred embodiment of the present invention. The WAN telephone system 350 includes a computer 355 and a communications interface 370. The computer 355 is suitably connected to the communications interface 370 by a suitable communication line 360. The WAN telephone systems 350 can communicate through the PSTN exchanges 370, either through a telephone carrier 410 or through a WAN 400.

The communication interface 370 is connected to a PSTN exchange 390 by a telephone line 380. Each of the computers 355 is also connected to an interactive input/output device 351 for enabling the users of the computers 355 to perform real-time or quasi-real-time communication such as a telephone conversation or a videophone conversation. For example the interactive input/output device 351 can be a sound card suitably connected to earphones or a speaker and to a microphone for performing a telephone conversation in accordance with a preferred embodiment of the present invention. In accordance with another preferred embodiment of the present invention, the interactive input/output device 351 can be a videophone device or a video-conferencing device for performing an audio-visual videophone conversation between the users of the computers 355.

It is noted that although FIG. 11 illustrates only two computers 355 that can be linked together by the method described in detail hereinafter, other computers (not shown) having suitable interactive input/output devices can be additionally connected to the two computers 355 using the WAN to create a teleconference or a videoconference.

It is also noted that the communications interface 370 can be any suitable communications interface such as an external or internal modem, suitably connectable to the computer 355.

It is still further noted that the telephone lines 380 can be any suitable type of communication lines using any suitable communication protocols and having a suitable bandwidth for performing telephone or videophone communication.

Figure 12:
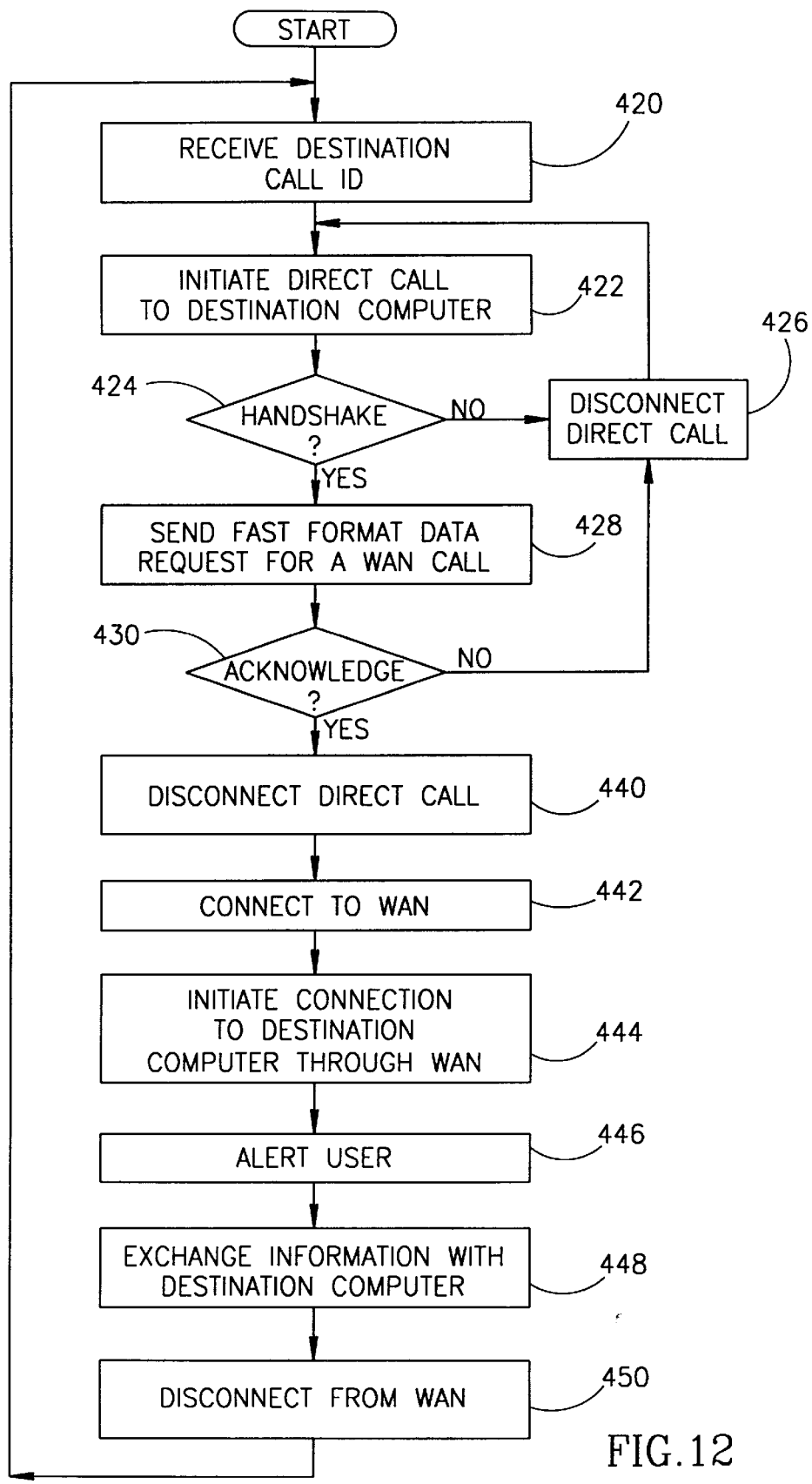
FIG. 12 is a schematic flow chart illustrating in detail the steps and the control flow of the method of handling outgoing calls in the WAN telephone system of FIG. 11, in accordance with a preferred embodiment of the present invention.
Figure 13:
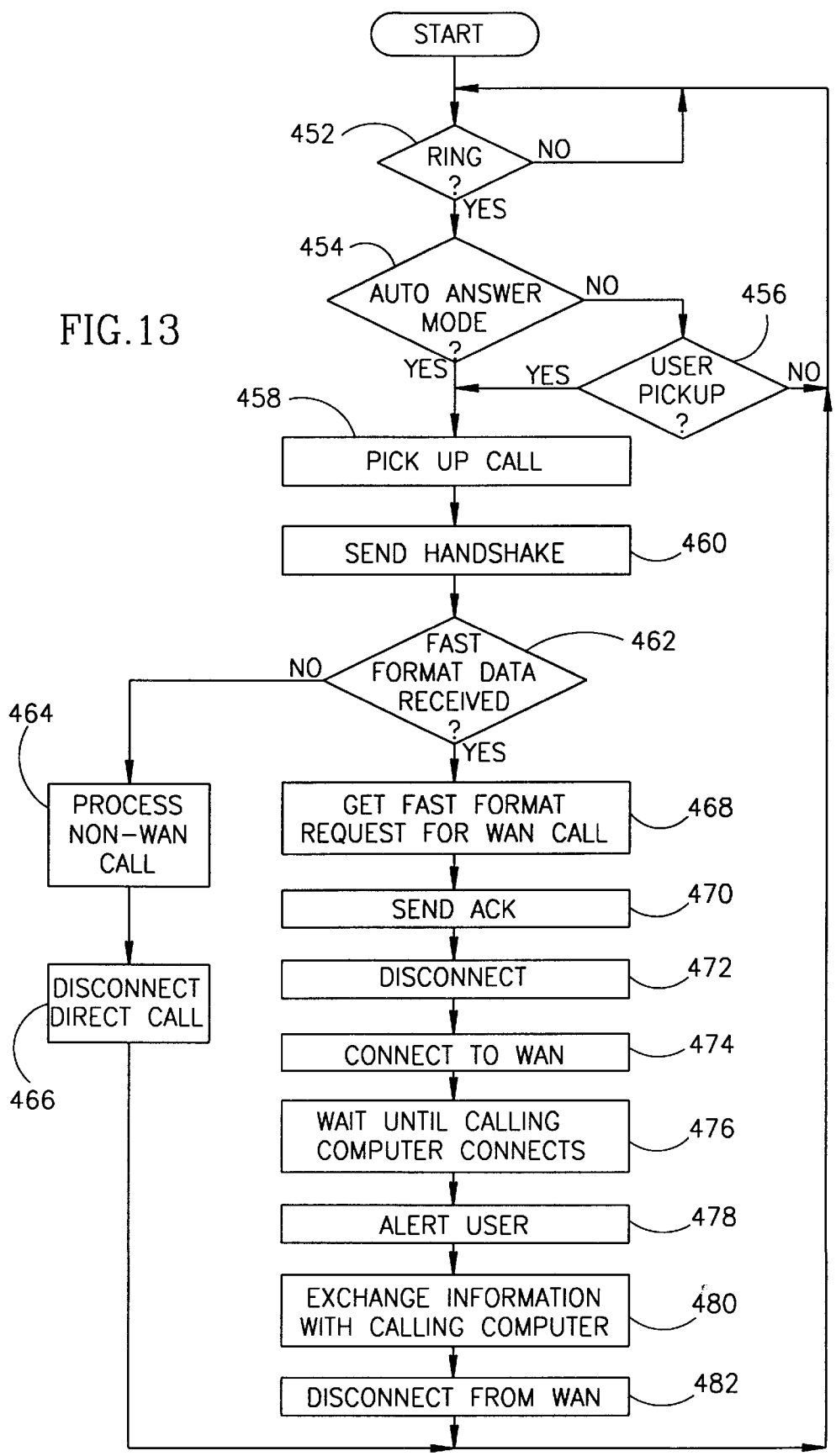
FIG. 13 is a schematic flow chart illustrating in detail the steps and the control flow of the method of handling incoming calls in the WAN telephone system of FIG. 11, in accordance with a preferred embodiment of the present invention.

Reference is now made to FIGS. 12 and 13 illustrating in detail the steps and the control flow of the method of handling outgoing calls and incoming calls, respectively, in the WAN telephone system of FIG. 11 in accordance with a preferred embodiment of the present invention.

FIG. 12 illustrates the details of the outgoing call flow control chart. The user enters the destination call ID. The system receives the destination call ID (step 420) and dials a direct telephone call to the destination computer by using the modem of the calling computer to establish a modem to modem connection through the PSTN (step 422). The system checks whether a handshake is performed by the destination computer's modem (step 424). If no handshake is detected the system disconnects the direct call (step 426) and transfers control to step 422.

If the system detects a handshake, the system sends a fast format data block which includes a request for a WAN call (step 428) and checks whether an acknowledge signal is detected (step 430). If an acknowledge signal is not detected, the system disconnects the direct call (step 426) and transfers control to step 422. If the system detects an acknowledge signal, the system disconnects the direct call (step 440), connects to the WAN (step 442), initiates a connection to the destination computer through the WAN by using the WAN address of the destination computer (step 444) and alerts the user that the WAN call is on (step 446). The system exchanges information with the destination computer by sending information using the packet switching protocols of the WAN (step 448).

The exchanged information can be any type of digital information such as compressed or non-compressed voice information, compressed or noncompressed video information or data files containing any other type of digital information. The information can also be encrypted and decrypted by the computers 355 using any suitable data encryption and decryption method (not shown). After the information is exchanged between the WAN telephone systems, the system disconnects from the WAN (step 450) and transfers control to step 420.

FIG. 13 illustrates the details of the incoming call flow control chart. The system checks whether a ring is detected (step 452). If a ring is not detected, the system returns to the initial point of the loop for repeating step 452. If the system detects a ring, the system checks to determine whether the auto-answer mode is active (step 454). If the auto-answer mode is not active, the system checks whether a user pick up is detected (step 456). If a user pick up is not detected the system transfers control to step 452. If a user pick up is detected, the system picks up the call (step 458) and sends a handshake signal (step 460). The system checks whether a fast format data block is received from the calling party (step 462). If a fast format data block is not received the system processes the non-WAN call (step 464), disconnects the direct call (step 466) and returns control to step 452.

If a fast format data block is received, the system gets the fast format request for the WAN call from the fast format data block (step 468), sends an ACK signal (step 470), disconnects the direct call (step 472), connects to the WAN (step 474), waits until the calling computer connects to it through the WAN (step 476) and alerts the user that an incoming wan call is on after the connection is established (step 478). The system exchanges information with the calling WAN telephone system as described in detail in FIG. 12 hereinabove (step 480), disconnects from WAN (step 482) and returns control to step 452.

It is noted that in the case that a caller ID including the telephone number of the calling party is supplied between the rings of the calling telephone or modem, or in the case that the caller identification was included in the data of the fast format data block, the step 476 in which the system waits until the calling computer connects through the WAN, can be replaced by a step in which the system looks up the WAN address of the calling computer in a LUT by looking for the WAN address associated with the telephone number supplied by the caller ID between the rings or with the caller identification data included in the fast format data block. However, irrespective of whether the caller computer or the called computer initiates the WAN connection between the computers in the case of an incoming call, care should be taken to make the incoming call and the outgoing call control flow consistent with each other so as to prevent a situation in which both computers will be trying to establish a WAN connection with each other simultaneously.

Figure 14A:
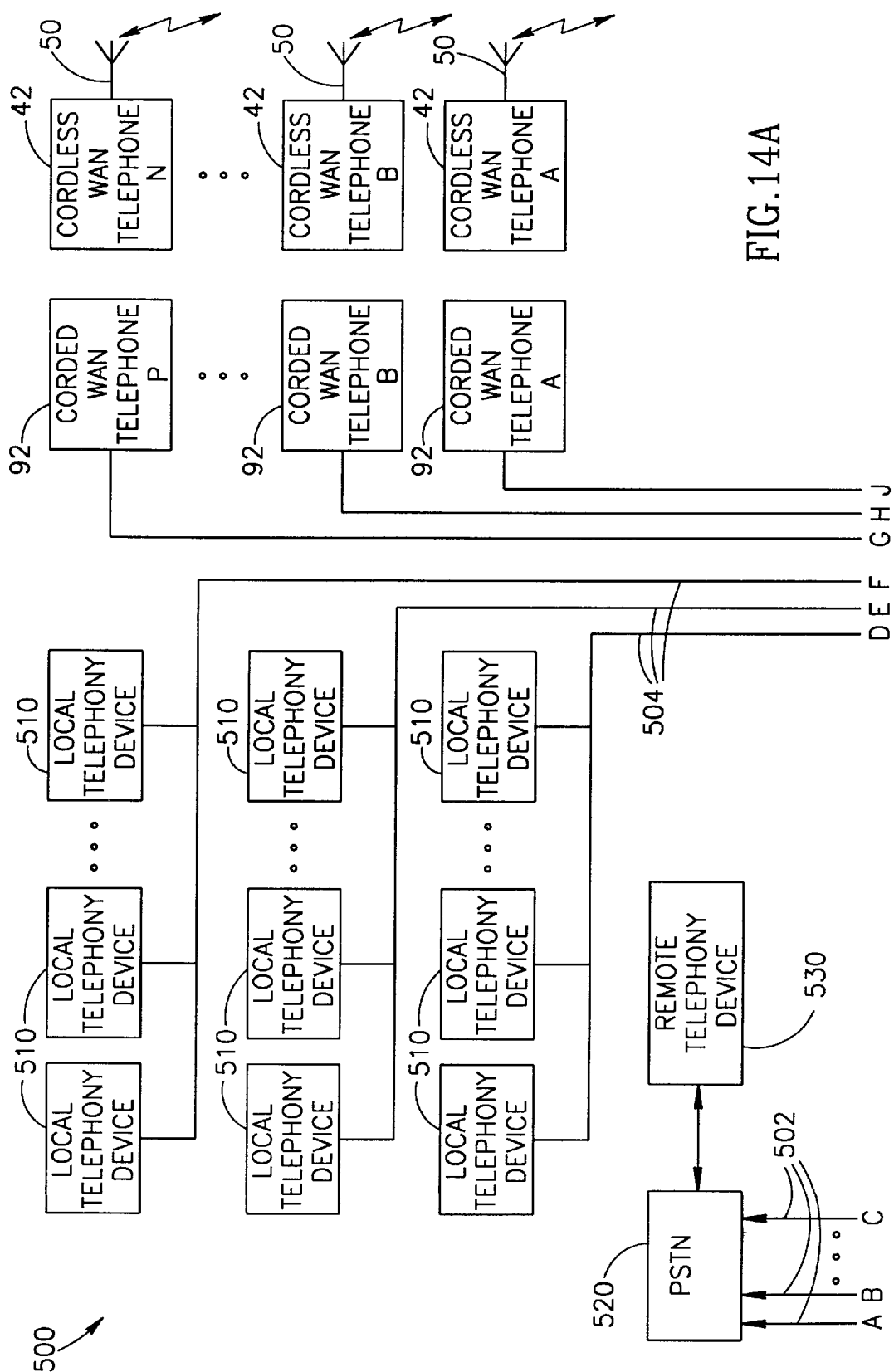
FIGS. 14A and 14B are schematic block diagrams illustrating A WAN telephone system including a plurality of interfaces and operable from a plurality of local or remote telephony devices in accordance with a preferred embodiment of the present invention.
Figure 14B:
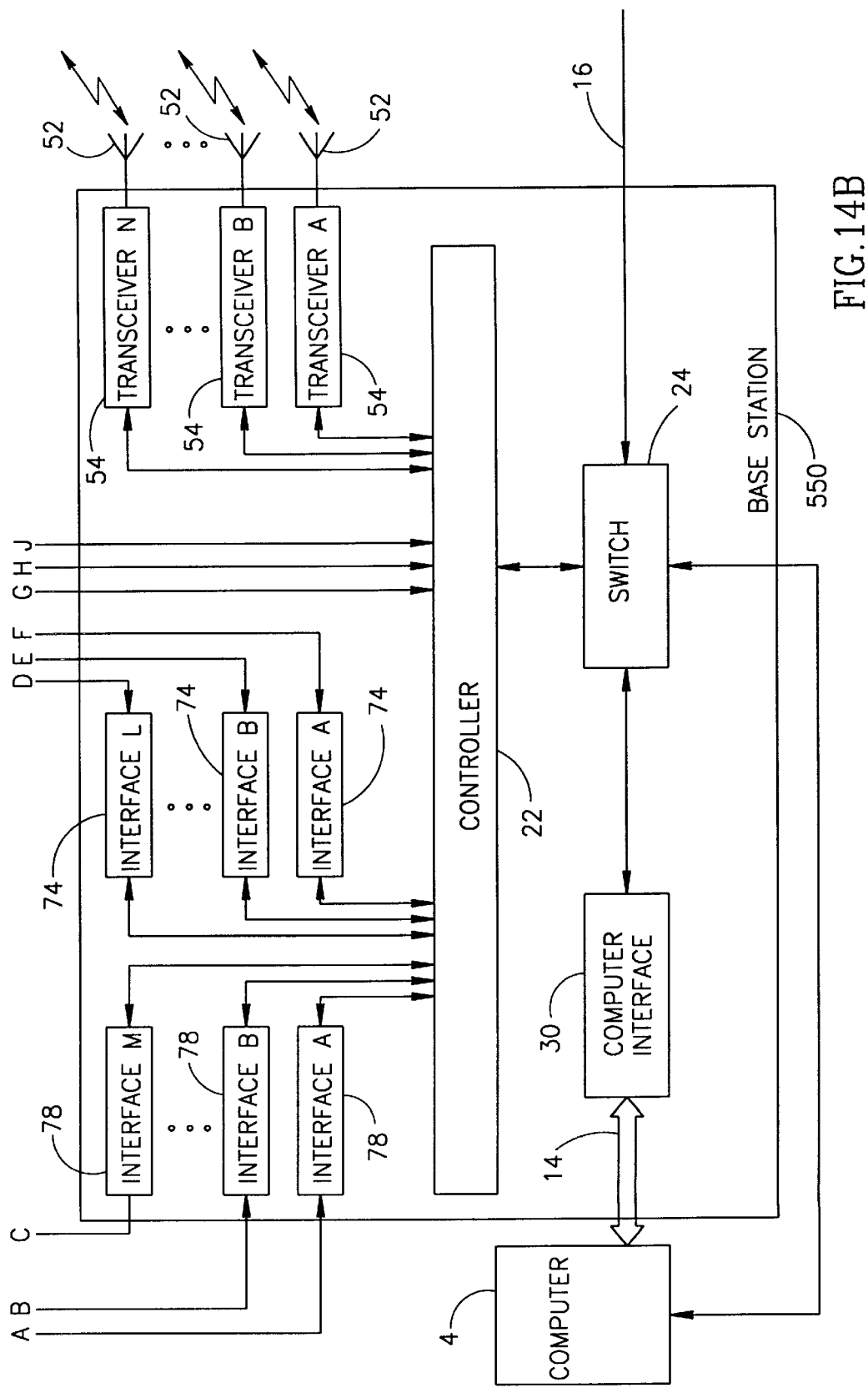

Reference is now made to FIG. 14 illustrating a WAN telephone system 500 in accordance with a preferred embodiment of the present invention.

The WAN telephone system 500 includes a base station 550 suitably connected to a computer 4 by a bidirectional digital communication line 14 and a modem line 12, as described in detail hereinabove. The base station 550 includes a controller 22, a switch 24 and a computer interface 30 interconnected as described in detail hereinabove.

The base station 550 also includes a plurality of L interfaces 74 suitably connected to the controller 22. Each one of the plurality of L interfaces 74 is connected to a plurality of local telephony devices 510, as described in detail hereinabove (FIG. 5) by one of a plurality of local "in-house" telephone lines 504. It is noted that each local telephony device 510 is connected to the local "in-house" telephone line 504 by a telephone socket (not shown). The base station 550 is also connected to each of the plurality of local "in-house" telephone lines 504 by a telephone socket (not shown).

It is noted that, each of the local telephony devices 510 can be any telephony device such as a regular corded telephone, a cordless telephone, a facsimile machine or any telephony device that can suitably communicate information through the PSTN.

The WAN telephone system 500 also includes a plurality of P corded WAN telephones 92 suitably connected to the controller 22 of the base station 550 as described in detail hereinabove (FIG. 7). It is noted that each of the plurality of P corded WAN telephones 92 includes the telephone interface 94 of FIG. 7, as described hereinabove.

The WAN telephone system 500 also includes a plurality of N cordless WAN telephones 42. Each of the plurality of N cordless WAN telephones 42 includes the antenna 50, the transceiver 46 (not shown) and the interface 44 (not shown) as disclosed in detail in FIG. 4. Each of the plurality of N cordless WAN telephones 42 is wirelessly connected to one of a plurality of N transceivers 54. Each of the plurality of N transceivers 54 is connected between an antenna 52 and the controller 22 of the base station 550 as described in detail hereinabove (FIG. 4).

It is noted that while the WAN telephone system 500 is illustrated as including a plurality of N cordless WAN telephones 42 and a plurality of N transceivers 54, other preferred embodiments of the present invention can be implemented wherein the number of transceivers 54 can be any number R where R is any number from 1 to N.

The base station 550 also includes a plurality of M interfaces 78, each of the plurality of M interfaces 78 is suitably connected to the controller 22 and to one of a plurality of secondary telephone lines 502. Each of the plurality of secondary telephone lines 502 being connected to the PSTN 520. A user can communicate with the base station 550 through any of the plurality of secondary telephone lines 502 by using a remote telephony device 530 suitably connected to the PSTN 520. The remote telephony device 530 can be any suitable telephony device such as a regular telephone or a cordless telephone or a cellular telephone or a facsimile machine. Using the remote telephony device 530 the user can control the base station 550 for performing various tasks or telephone call types by using various serial key combinations as described in details hereinabove for the preferred embodiment illustrated in FIG. 6.

It is noted that the plurality of M secondary telephone lines 502 can be connected to the PSTN 520 through any suitable number of different PSTN exchanges (not shown).

It will be appreciated by persons skilled in the art that while the WAN telephone system 500 comprises a plurality of each of the interface 78, the interface 74, the transceiver 54 and the corded WAN telephone 92, other preferred embodiments of the WAN telephone system of the present invention can include other combinations wherein each one of the group of numbers including M, N, L and P can be either zero or equal to any other of the numbers in the group or different from any of the numbers in the group.

It is noted that the method for performing a WAN telephone conversation, illustrated in FIGS. 12 and 13 and described hereinabove, has the advantage that it uses an automatic procedure for initiating a WAN telephone call between the caller and the destination users, even if the destination user's computer is not connected to the WAN at the time that the caller makes the call. Once the user has specified the requested telephone number, the WAN telephone system performs all the steps necessary for requesting the WAN call and transferring the necessary information to the destination WAN telephone system by automatically performing the direct dialling and the fast format information transfer protocol, thus, minimizing the time required for the more expensive direct call.

It is noted that, in the preferred embodiments of the WAN telephone system illustrated in FIGS. 3A, 3B, 4, 10, 14A and 14B, the user interfaces 20, 44 and 356 include all the necessary parts that are required for implementing standard telephony functions, such as a microphone, an earphone and all the necessary electronic circuitry for receiving and sending analog voice signals from the microphone and to the earphone, respectively. Additionally the user interfaces 20, 44 and 356 can include any suitable type of keyboard and the electronic circuitry associated therewith for receiving user input, and any other suitable components for generating audible, visual or tactile messages to the user such as a liquid crystal display (LCD) for displaying graphic or textual information or a vocoder, suitably linked to the earphone, for generating synthetic voice messages.

It is noted that, in accordance with a preferred embodiment of the present invention, the computers 4 and 355 may be any suitable computer, using any suitable operating system. For example the computer can be a personal computer operated by the Windows 95 operating system available from Microsoft Corporation, Redmond, Wash. U.S.A.

It is also noted that the local facsimile machine 65 of FIG. 5 and the remote facsimile machine 85 of FIG. 6 can be any suitable type of facsimile machine such as a stand-alone facsimile machine or any fax-modem installed internally or externally in a computer.

It is further noted that the WAN telephone system must include a suitable communication interface such as a modem which is operably connected to the computer 4.

It is also noted that the WAN telephone systems described and illustrated hereinabove in accordance with the preferred embodiments of the present invention can be implemented to operate as half-duplex systems or as full-duplex systems.

It is still further noted that, while the WAN telephone systems communicating with each other in FIGS. 1, 2A, 2B and 11 are shown to be of the same type for the sake of clarity of illustration, they can also be of different types. For example, in one of the users local equipment 2 illustrated in FIG. 1 the computer 4 can be an IBM compatible personal computer, the WAN telephone system 6 can be the WAN telephone system 40 of FIG. 4 in which the computer interface 30 is a serial computer interface, while in the other user's local equipment 2 of the same figure the computer 4 can be a Macintosh personal computer, the WAN telephone system 6 can be the WAN telephone system 100 of FIG. 6 and the computer interface 30 can be a data bus interface.

It will be appreciated by persons skilled in the art that the present invention is not limited to what has been particularly shown and described hereinabove. Rather the scope of the present invention is defined only by the claims which follow:

I claim:

1. A telephone for communicating information using the public switched telephone network (PSTN) or a wide area network (WAN), the telephone being connectable to a computer and to a primary telephone line, the computer comprising at least one communications interface connectable to the PSTN, the telephone comprising:

a computer interface for communicating with said computer;

at least one communication unit for receiving telephony signals from a user and providing telephony signals to said user;

a controller suitably connected to said at least one communication unit for processing the signals received from said at least one communication unit or the output of said computer and for controlling said at least one communication unit or said computer; and a switch suitably connected to said controller, said computer interface and said primary telephone line for controlling the flow of information between said controller, said computer and said primary telephone line, said switch being switchable between two states, a first state in which said at least one communication unit is connected to the PSTN through said controller and said switch and a second state in which said at least one communication unit is connected through said controller, said switch and said computer interface to said computer, and said communications interface of said computer is connected to the PSTN by said primary telephone line.

2. A telephone according to claim 1 and wherein said at least one communication unit comprises:

at least one local telephony device suitably connected to a local telephone line; and an interface suitably connected to said local telephone line and said controller for interfacing said at least one local telephony device with said controller, wherein said local telephone line comprises local telephone wires and the telephony sockets connected thereto.

3. A telephone according to claim 1 and wherein said at least one communication unit comprises:
   a remote telephony device suitably connected through the PSTN to a secondary telephone line; and
   an interface suitably connected to said secondary telephone line and to said controller for interfacing said remote telephony device with said controller.

4. A telephone according to claim 1 and wherein said at least one communication unit comprises:
   a first transceiver suitably connected to said controller;
   a cordless WAN telephone for wirelessly communicating with said first transceiver, the cordless WAN telephone comprising:
      a user interface for receiving telephony signals from said user and sending telephony signals to said user; and
      a second transceiver suitably connected to said user interface for wirelessly communicating with said first transceiver.

5. A telephone according to claim 1 and wherein said at least one communication unit comprises:
   a corded WAN telephone suitably connected to said controller, the corded WAN telephone comprising a user interface for receiving telephony signals from said user and sending telephony signals to said user.

6. A telephone according to claim 1 and wherein said at least one communications interface of said computer is a modem.

7. A telephone according to claim 1 and wherein said information is selected from the group consisting of: voice information, control information, text information, data files, graphic information and video information.

8. A telephone according to claim 1 and wherein said information is selected from the group consisting of: analog information, digital information and a combination of analog information and digital information.

9. A telephone according to claim 1 and wherein said computer also comprises a sound card for digitizing analog voice signals of said user received from said at least one communication unit and for converting digital voice data received by said computer from said WAN into analog voice signals, said analog voice signals being communicated through said controller to said at least one communication unit.

10. A telephone according to claim 1 and wherein said information is encrypted by said computer prior to being communicated through the PSTN.

11. A telephone according to claim 1 and wherein said information is decrypted by said computer after being received through the PSTN.

12. A telephone system for communicating information using the public switched telephone network (PSTN) or a wide area network (WAN), the telephone system comprising:
   a computer comprising at least one communications interface connectable to the PSTN; and
   a telephone for communicating information using the PSTN or a WAN, said telephone being suitably connected to said computer and to a primary telephone line, the telephone comprising:
      a computer interface for communicating with said computer;
      at least one communication unit for receiving telephony signals from a user and providing telephony signals to said user;
      a controller suitably connected to said at least one communication unit for processing the signals received from said at least one communication unit or the output of said computer and for controlling said at least one communication unit or said computer; and
      a switch suitably connected to said controller, said computer interface and said primary telephone line for controlling the flow of information between said controller, said computer and said primary telephone line, said switch being switchable between two states, a first state in which said at least one communication unit is connected to the PSTN through said controller and said switch and a second state in which said at least one communication unit is connected through said controller, said switch and said computer interface to said computer, and said communications interface of said computer is connected to the PSTN by said primary telephone line.

13. A telephone system according to claim 12 and wherein said at least one communication unit comprises:
   at least one local telephony device suitably connected to a local telephone line; and
   an interface suitably connected to said local telephone line and said controller for interfacing said at least one local telephony device with said controller,
   wherein said local telephone line comprises local telephone wires and the telephony sockets connected thereto.

14. A telephone system according to claim 12 and wherein said at least one communication unit comprises:
   a remote telephony device suitably connected through the PSTN to a secondary telephone line; and
   an interface suitably connected to said secondary telephone line and to said controller for interfacing said remote telephony device with said controller.

15. A telephone system according to claim 12 and wherein said at least one communication unit comprises:
   a first transceiver suitably connected to said controller; and
   a cordless WAN telephone for wirelessly communicating with said first transceiver, the cordless WAN telephone comprising:
      a user interface for receiving telephony signals from said user and sending telephony signals to said user; and
      a second transceiver suitably connected to said user interface for wirelessly communicating with said first transceiver.

16. A telephone system according to claim 12 and wherein said at least one communication unit comprises:
   a corded WAN telephone suitably connected to said controller, the corded WAN telephone comprising a user interface suitably connected to said controller for receiving telephony signals from said user and sending telephony signals to said user.

17. A telephone system according to claim 12 and wherein said at least one communications interface of said computer is a modem.

18. A telephone system according to claim 12 and wherein said information is selected from the group consisting of: voice information, control information, data files, graphic information and video information.

19. A telephone system according to claim 12 and wherein said information is selected from the group consisting of: analog information, digital information and a combination of analog information and digital information.

20. A telephone system according to claim 12 and wherein said computer also comprises a sound card for digitizing analog voice signals of said user received from said at least one communication unit and for converting digital voice data received by said computer from said WAN into analog voice signals, said analog voice signals being communicated through said controller to said at least one communication unit.

21. A telephone system according to claim 12 and wherein said information is encrypted by said computer prior to being communicated through the PSTN.

22. A telephone according to claim 12 and wherein said information is decrypted by said computer after being received through the PSTN.

23. A method for exchanging information between a first communication system and a second communication system, each of the first and second communication systems comprising at least a computer, the computer comprising a communications interface, each of the first and second communication systems being connectable to the public switched telephone network (PSTN) and to a wide area network (WAN), the method comprising the steps of:

dialling a first telephone call through the PSTN from said first communication system to said second communication system;

sending a data block from said first communication system to said second communication system, said data block comprising at least data defining a call request;

disconnecting said first telephone call between said first communication system and said second communication system;

each of said first and second communication systems connecting to said WAN by dialing a second telephone call, wherein said second communication system uses said call request data of said data block for dialling said second telephone call;

said first communication system connecting to said second communication system through said WAN; and exchanging said information between said first communication system and said second communication system through said WAN.

24. A method according to claim 23 further comprising, after the step of exchanging, the step of said first communication system and said second communication system disconnecting from said WAN.

25. A method according to claim 23 and wherein said data block is a fast format data block using a fast format data communication protocol.

26. A method according to claim 25 and wherein the fast format data communication protocol is selected from the group consisting of: a DTMF communication protocol, a Bell 202 communication protocol, a Bell 103 communication protocol, a CCITT V.21 communication protocol and a CCITT V.23 communication protocol.

27. A method according to claim 23 and wherein said data block further comprises data which identifies said first communication system.

28. A method according to claim 23 and wherein said step of exchanging further includes the step of encrypting said information before exchanging it.

29. A method according to claim 28 and wherein said data block further comprises a public key for decrypting encrypted information, said encrypted information being generated by said step of encrypting and exchanged by said step of exchanging.

30. A method according to claim 23 and wherein said information is selected from the group consisting of: voice information, control information, data files, graphic information, video information and any combination thereof.

31. A method according to claim 23 and wherein said information is selected from the group consisting of: analog information, digital information, a combination of analog information and digital information.

32. A method according to claim 23 and wherein said step of exchanging is selected from the group of steps consisting of: the step of transferring said information unidirectionally from said first communication system to said second communication system, the step of transferring said information unidirectionally from said second communication system to said first communication system and the step of bidirectionally transferring said information from said first communication system to said second communication system and from said second communication system to said first communication system.

33. A method according to claim 23 and wherein at least one of said first communication system and said second communication system also comprises at least one means for processing information, said at least one means for processing information being suitably connected to said computer, said at least one means for processing information inputting or outputting said exchanged information, and wherein said at least one means for processing information is selected from the group consisting of: a videophone device, a videoconferencing device and a sound card connected to a microphone and earphones or a speaker.

34. A method according to claim 23 and wherein at least one of said first communication system and said second communication system also comprises a WAN telephone, the WAN telephone being connected to said computer and to a telephone line.

35. A method according to claim 23 and wherein at least one of said first communication system and said second communication system is a WAN telephone system.

36. A method for exchanging information between a first communication system and a second communication system, each of said first and second communication systems comprising at least a computer and a communications interface, each of said first and second communication systems being connectable to the public switched telephone network (PSTN) and to a wide area network (WAN), the method comprising the steps of:

dialling a first telephone call through the PSTN from said first communication system to said second communication system;

sending a data block from said first communication system to said second communication system, said data block comprising at least data defining a call request;

disconnecting said first telephone call between said first communication system and said second communication system;

each of said first and second communication systems connecting to said WAN by dialing a second telephone call, wherein said second communication system uses said call request data of said data block for dialling said second telephone call;

said second communication system connecting to said first communication system through said WAN by using data received during said first telephone call to obtain a WAN address of said first communication system; and exchanging said information between said first communication system and said second communication system through said WAN.

37. A method according to claim 36 further comprising, after the step of exchanging, the step of said first communication system and said second communication system disconnecting from said WAN.

38. A method according to claim 36 and wherein said data block is a fast format data block using a fast format data communication protocol.

39. A method according to claim 38 and wherein said fast format data communication protocol is selected from the group consisting of: a DTMF communication protocol, a Bell 202 communication protocol, a Bell 103 communication protocol, a CCITT V.21 communication protocol and a CCITT V.23 communication protocol.

40. A method according to claim 36 and wherein said data block further comprises a caller identification data, said caller identification data comprising a WAN address of said first communication system and wherein said WAN address of said first communication system is used by said second communication system for connecting to said first communication system through said WAN.

41. A method according to claim 36 and wherein said step of exchanging further includes the step of encrypting said information before exchanging it.

42. A method according to claim 41 and wherein said data block further comprises a public key for decrypting encrypted information, said encrypted information being generated by said step of encrypting and exchanged by said step of exchanging.

43. A method according to claim 36 and wherein said information is selected from the group consisting of: voice information, control information, data files, graphic information and video information and any combination thereof.

44. A method according to claim 36 and wherein said information is selected from the group consisting of: analog information, digital information, a combination of analog information and digital information.

45. A method according to claim 36 and wherein said step of exchanging is selected from the group of steps consisting of: the step of transferring said information unidirectionally from said first communication system to said second communication system, the step of transferring said information unidirectionally from said second communication system to said first communication system and the step of bidirectionally transferring said information from said first communication system to said second communication system and from said second communication system to said first communication system.

46. A method according to claim 36 and wherein said data received during said first telephone call and used by said second communication system to obtain the WAN address of said first communication system is the standard telephony caller ID data comprising at least the telephone number associated with said first communication system, said data being communicated to said second communication system between the rings of said first telephone call, and wherein said second communication system obtains the WAN address of said first communication system from a look up table (LUT) stored by said second communication system.

47. A method according to claim 36 and wherein at least one of said first communication system and said second communication system is suitably connected to at least one means for processing information, said at least one means for processing information inputing or outputing said exchanged information, and wherein said at least one means for processing information is selected from the group consisting of: a videophone device, a video-conferencing device and a sound card connected to a microphone and earphones or a speaker.

48. A method according to claim 36 and wherein at least one of said first communication system and said second communication system also comprises a WAN telephone, said WAN telephone being connected to said computer and to the PSTN.

49. A method according to claim 36 and wherein at least one of said first communication system and said second communication system is a WAN telephone system.

* * * * *